United States Patent [19]
Dai et al.

[11] Patent Number: 5,559,859
[45] Date of Patent: *Sep. 24, 1996

[54] PAGING SYSTEM THAT ALLOWS CALLER/SUBSCRIBER INTERCONNECTION

[75] Inventors: Susan W. S. Dai, Richmond; Donald W. Gayton; Brian G. Laird, both of Vancouver; Randy T. Tkatch, Burnaby, all of Canada; Sonny Bettis, Lawrenceville, Ga.; Marc Fitzhugh, Alpharetta, Ga.; Shandton Williams, Atlanta, Ga.; Phillip Lowman, Ellijay, Ga.; Julio Gonzalez, Tucker, Ga.

[73] Assignee: Glenayre Electronics, Inc., Charlotte, N.C.

[ * ] Notice: The term of this patent shall not extend beyond the expiration date of Pat. No. 5,307,399.

[21] Appl. No.: 302,682

[22] Filed: Mar. 10, 1995

Related U.S. Application Data

[63] Continuation-in-part of Ser. No. 848,413, Mar. 6, 1992, Pat. No. 5,307,399.

[51] Int. Cl.⁶ .................................................. H04Q 7/38
[52] U.S. Cl. ........................... 379/51; 379/50; 379/61; 379/210
[58] Field of Search .......................... 379/57, 58, 61, 379/210, 212, 128

[56] References Cited

U.S. PATENT DOCUMENTS

| | | | |
|---|---|---|---|
| 4,680,785 | 7/1987 | Akiyama et al. | 379/57 |
| 4,748,655 | 5/1988 | Thrower et al. | 379/60 |
| 5,140,626 | 8/1992 | Ory et al. | 379/57 |
| 5,148,473 | 9/1992 | Freeland et al. | 379/57 |
| 5,151,929 | 9/1992 | Wolf | 379/57 |
| 5,166,973 | 11/1992 | Hoff | 379/57 |
| 5,307,399 | 4/1994 | Dai et al. | 379/57 |
| 5,311,570 | 5/1994 | Grimes et al. | 379/57 |
| 5,375,161 | 12/1994 | Fuller et al. | 379/210 |

FOREIGN PATENT DOCUMENTS

| | | |
|---|---|---|
| 0216515 | 4/1987 | European Pat. Off. . |
| 193861 | 2/1988 | United Kingdom . |

*Primary Examiner*—Dwayne D. Bost
*Attorney, Agent, or Firm*—Christenson O'Conner Johnson & Kindness

[57] ABSTRACT

A telecommunications system that performs page-connect paging is disclosed. The telecommunications system of this invention includes a paging system (28) that is designed to receive calls from page-connect paging system subscribers. Once such a call is received, the system (28) parks the call on hold while sending a page to the subscriber. The subscriber can then call the paging terminal (28) to automatically be connected with the calling party. The system further includes a cordless telephone-2 system (26) wherein each of the system subscribers is further provided with a portable handset (26) from which he can access the publicly switched telephone network. Subscribers with the handset, upon receiving a page-connect page, can automatically dial the paging terminal (28) to be connected to their calling parties. Thus, the telecommunications system of this invention provides a convenient means of providing subscribers with portable telephone service that allows them to both make outgoing calls and receive incoming calls.

8 Claims, 16 Drawing Sheets

| 108 | PUB. NO. | SERVICE | F.F. | F.F. | F.F. | F.F. | F.F. | F.F. | CAP CODE | ENC. | PRIV. NO. |
|---|---|---|---|---|---|---|---|---|---|---|---|
| 108 | PUB. NO. | SERVICE | F.F. | F.F. | F.F. | F.F. | F.F. | F.F. | CAP CODE | ENC. | PRIV. NO. |
| 108 | PUB. NO. | SERVICE | F.F. | F.F. | F.F. | F.F. | F.F. | F.F. | CAP CODE | ENC. | PRIV. NO. |

FIG. 7.

| 121 | PUB. TRUNK | PRIV. TRUNK | RESOURCE |
|---|---|---|---|
| 121 | PUB. TRUNK | PRIV. TRUNK | RESOURCE |
| 121 | PUB. TRUNK | PRIV. TRUNK | RESOURCE |

FIG. 8.

PAGING SYSTEM THAT ALLOWS CALLER/SUBSCRIBER INTERCONNECTION

This application is a continuation-in-part of U.S. patent application Ser. No. 07/848,413 filed Mar. 6, 1992, now issued as U.S. Pat. No. 5,307,399.

FIELD OF THE INVENTION

This invention relates generally to telecommunications systems and, more particularly, to a paging system that will automatically connect a system subscriber to a person calling the subscriber.

BACKGROUND OF THE INVENTION

A paging system is used to send electronic notices, called pages, to system subscribers to inform them that they have been called by other individuals. A typical paging system includes a paging terminal and one or more paging stations. The paging terminal is connected to the publicly switched telephone network and is configured to receive incoming telephone calls from individuals interested in accessing the system subscribers. In response to receiving a call, the paging terminal creates a block of information, a page, for the subscriber. The page is forwarded to the paging stations, which then broadcast the page. System subscribers carry pagers, which are miniaturized radio receivers. When a pager receives a page for the subscriber to whom the pager has been assigned, the pager actuates an internal audio annunciator and/or display to reform the subscriber of the page and its contents.

A paging system is typically configured so that a system subscriber can select the class or type of paging service that he wants to receive. The basic service many paging systems offer is to simply broadcast a page to the subscriber to inform the subscriber that he has been called. Once the subscriber has received this page, which is indicated by a beeping tone and/or a flashing light, the subscriber must access the paging terminal to find the identity, or at least the phone number, of the calling party. Many paging systems offer subscribers an intermediate level of service, which allows the subscribers to receive a short numeric or alphanumeric message as part of the page. This message is presented on a small display integral with the pager. Some paging systems offer an even more advanced level of service that allows a caller to leave a message that will be transmitted to the subscriber. A pager carried by a subscriber using this service includes a small audio signal-processing circuit that, upon receipt of the page, plays the message on a small speaker also integral with the pager. Many paging systems also include some type of voice-mail storage capability that allows a caller to record a message that the subscriber can retrieve at his convenience. Some paging systems are even configured to allow system subscribers to make customized greetings that instruct callers how to make a page and/or leave a voice-mail message. Many paging systems are configured to allow a subscriber to select the particular services that form his/her package of paging services.

While paging systems have proved a useful means for contacting individuals who are away from their telephones, they suffer a serious limitation. Few paging systems offer any means for actually connecting a subscriber to a caller. Consequently, many individuals prefer to subscribe to cellular telephone systems. These systems provide subscribers with cordless portable telephones. These systems also include a number of fixed mobile telephone switching offices (MTSOs). Equipment in the MTSOs tracks the cellular telephones and provides a radio link between the callers and cellular telephone subscribers. A disadvantage of cellular telephone systems, however, is that there are limited radio frequencies over which cellular service can be offered. Consequently, cellular telephone systems can be used to offer communications services for only a limited number of subscribers. Another disadvantage of cellular telephone systems is that, in order for a subscriber to use the his portable telephone, he must be in an area that is served by his cellular service provider. Many cellular providers offer service through only a limited service area. Once a subscriber leaves the service area, he is no longer able to receive incoming calls.

SUMMARY OF THE INVENTION

This invention relates generally to a telecommunications system that provides portable communication connections to a large number of individuals over a large geographic area and that can provide such service at minimal expense. More particularly, this invention is related to a paging system intended to be used in conjunction with a cordless telephone-2 (CT-2) communications system.

The telecommunications system of this invention includes a paging system that includes caller/subscriber interconnect or "page-connect" capabilities. In one preferred embodiment of this invention, the paging system includes a paging terminal that is configured so that each page-connect service subscriber is assigned two telephone numbers. One telephone number, the public telephone number, is the number the subscriber distributes as his/her pager number. The second telephone number is the subscriber's private telephone number; the subscriber keeps this number confidential. The paging terminal of this invention also includes a switch that can selectively establish an interconnection between a call to the subscriber's public number and a call to his/her complementary private number.

When a caller dials the public number of a subscriber to this system, the paging terminal initially places the call on hold and simultaneously broadcasts a page to the subscriber. The subscriber then has a predetermined amount of time to call the system over his private number. If the subscriber calls in during this time, the paging terminal will automatically interconnect the caller and the subscriber so that the two parties can converse in a normal manner.

The paging system of this invention is designed to be used in conjunction with a cordless telephone-2 (CT-2) system to provide a low-cost portable bi-directional communications system. In a CT-2 system, the subscribers are provided with small, low-powered portable radio transceivers called handsets. The system also includes a set of base stations that are located throughout the geographic area in which the system is installed. The base stations are connected to the publicly switched telephone network. A CT-2 system subscriber makes a telephone call by first establishing a radio link through his/her handset to a nearby base station. The subscriber then transmits the number of the party being called; equipment in the base station then establishes the subscriber/called party interconnection over the publicly switched telephone network.

The paging system of this invention, when combined with a CT-2 system, functions as a telecommunications system that allows system subscribers with CT-2 handsets to both make outgoing calls and receive incoming calls. In the telecommunications system of this invention, the CT-2 subscribers are provided with pagers. In some preferred versions of this invention, the pagers are built into the CT-2 handsets. The CT-2 handsets are also provided with an autodial circuit that allows the subscriber to dial a number, his private paging system telephone number, with the press of a single button. When a call is made to one of the subscribers to this system, the call is parked on hold while a page is broadcast to the subscriber's handset. Upon receipt of the page, the subscriber can complete the call by actuating the autodial button on the handset. This causes the CT-2 system to access the paging terminal through the subscriber's private number; the paging terminal then connects the caller to the subscriber so that they can converse.

The telecommunications system of this invention provides a mechanism for connecting callers directly with the subscribers they are trying to reach. Callers do not have to wait for subscribers to return their calls. Subscribers can, if they elect, be immediately connected to parties who are trying to reach them.

When the paging system is combined with a CT-2 system, the telecommunications system of this invention allows subscribers to both make and receive calls through portable CT-2 handsets. Since pages are broadcast on a system-wide basis, the telecommunications system of this invention does not have to be provided with expensive tracking equipment that constantly monitors the location of each handset. Since the CT-2 portion of the system operates over frequencies that are separate from those over which cellular systems operate, the system of this invention makes call-or-be-called portable telephone services available to a larger population.

Other features of the telecommunications system of this invention enhance its utility to subscribers and callers alike. In the event a subscriber does not complete a phone connection to a caller, the caller can be invited to leave a voice-mail message that the subscriber can retrieve at his convenience. In some versions of the invention, the subscriber can forward commands to the paging terminal to indicate his willingness or unwillingness to accept page-connect pages. Depending on the command generated by the subscriber, the paging terminal will either send a page-connect page or simply invite the caller to leave a message. The system can further be constructed so that a caller may first be required to enter a command before a page-connect page will be transmitted. This will allow a subscriber to select the callers from whom he will accept a page-connect page. If the subscriber wants to accept page-connect pages from an individual, the subscriber will give that individual his public paging system number and his page-connect page access code. If the subscriber wants to accept only basic pages and/or voice mail from an individual, the subscriber will give that individual only his public paging system number.

The system may also be configured to give the caller or the subscriber the option of proceeding with the page-connect call. For example, when the caller first tries to access the subscriber through the system, the system can give the caller the option of leaving a message in the subscriber's voice mailbox, being connecting to a third party such as the subscriber's secretary, or having the page-connect page generated in anticipation of being connected to the caller. The system can also be designed to provide the subscriber with some identification of the caller along with the page-connect page. These versions of the system may further be configured to give the subscriber the choice of being connected to the caller or forwarding the call to another destination.

Another advantage of this system is that it allows the system operator to offer potential subscribers various classes of service. Individuals can take advantage of simply the basic paging service, the more advanced page-connect paging service wherein the individual has a CT-2 handset, or any range of services therebetween.

BRIEF DESCRIPTION OF THE DRAWINGS

The invention is defined with particularity in the appended claims. The advantages of this invention may be understood by referring to the following detailed description in which:

FIG. 7 illustrates the subscriber library that is maintained by the paging system of this invention and further specifically illustrates the contents of an individual subscriber record in the library;

FIG. 8 illustrates the trunk pair table that is maintained by the paging system of this invention and further specifically illustrates the content of an individual trunk pair record in the table;

DETAILED DESCRIPTION OF THE PREFERRED EMBODIMENT

Figure 1:
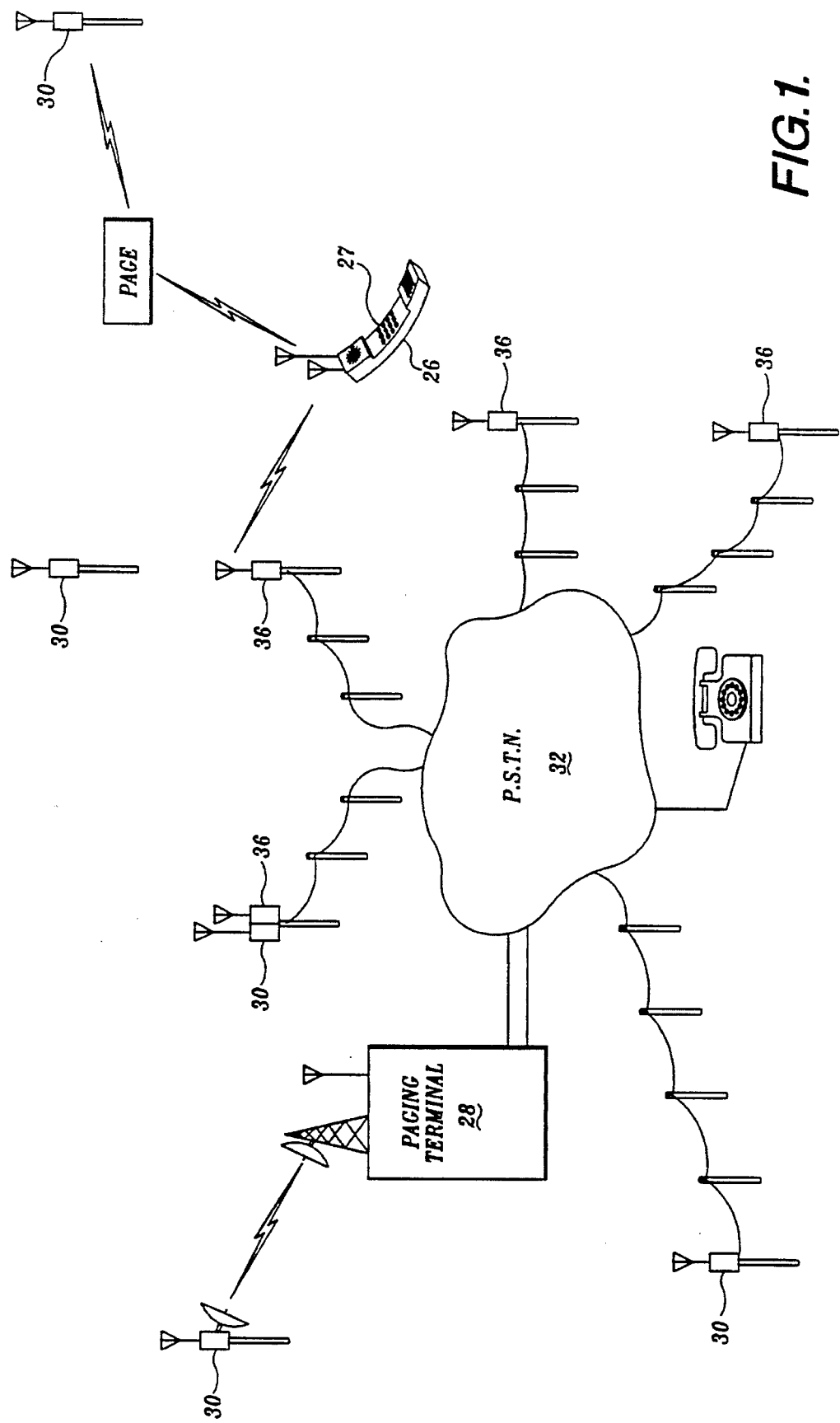
FIG. 1 is a block diagram illustrating the main components of the telecommunications system of this invention.

The telecommunications system of this invention is illustrated in block diagram by FIG. 1 including a paging system and a cordless telephone-2 (CT-2) wireless communications system. Persons that subscribe to the system each carry a small, portable handset 26, that serves as a transceiver over which audio, voice, signals can be exchanged through the CT-2 system. Integral with the handset 26 is a pager 27, which is a small receiver for receiving signals from the paging system. The paging system includes a paging terminal 28 and a set of paging stations 30. The paging terminal 28 is connected to the publicly switched telephone network (PSTN) 32 for receiving telephone calls from individuals trying to access the system subscribers. When such a call is received, the paging terminal 28 creates a message, called a page, for the subscriber and forwards the page to the paging stations 30. The paging stations 30 broadcast the page, which is received by the pager 27.

The CT-2 system includes a set of base stations 36 that are low-powered transceivers configured to exchange signals with the handsets 26. Some of the base stations 36 may be geographically located with paging stations 30; other base stations may stand alone. Each base station 36 is connected to the publicly switched telephone network 32 and serves as the signal interface between the network 32 and the handset 26 with which a radio link has been established. When a system subscriber receives a page, he/she can access the caller by activating the handset transceiver. A telephone link will be established between handset 26 and the paging terminal 28 through an adjacent base station 36 and the publicly switched telephone network 32. When the subscriber's call reaches the paging terminal 28, the paging terminal connects the caller to the subscriber so that the two can converse in a normal manner.

Figure 2:
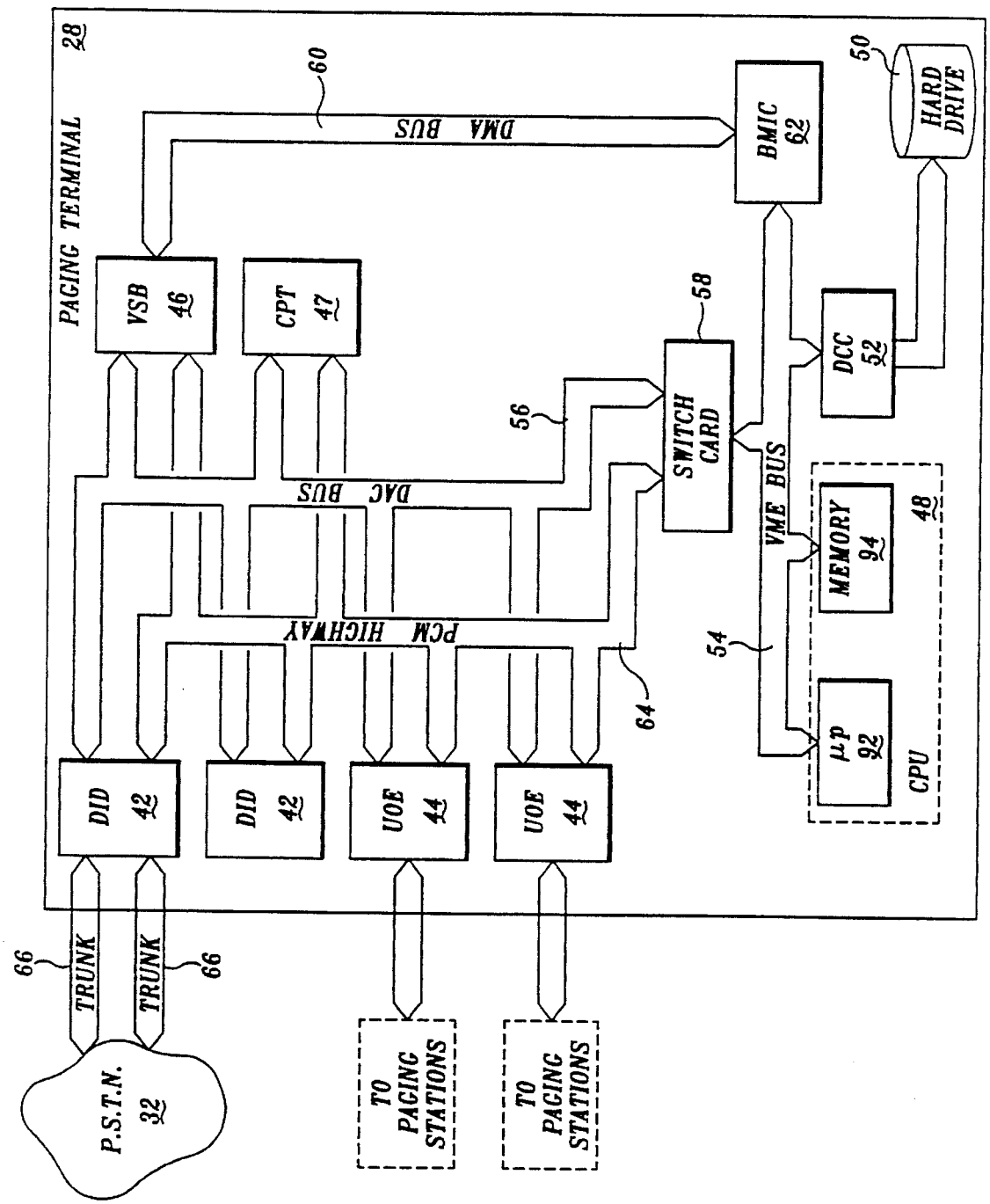
FIG. 2 is a block diagram illustrating relevant subunits of a paging system as incorporated into the telecommunications system of this invention.

The paging system of this invention is described in greater detail with reference to FIG. 2. The paging terminal 28 comprises a terminal capable of generating pages and serving as a voice-mail storage and retrieval unit. One such terminal is the GL3000 Message Management System and Voice Retrieval System manufactured by Glenayre Electronics Ltd. of Vancouver, British Columbia, Canada. The paging terminal 28 includes one or more direct inward dial (DID) cards 42 that function as the interface between the paging system and the publicly switched telephone network 32. One or more universal output encoder (UOE) cards 44 forward pages 34 to the paging stations 30 for broadcast. The paging terminal 28 has at least one voice storage board (VSB) 46 that serves as a temporary buffer to store voice messages for replay out to the system subscribers through the DID cards. The VSB also contains a number of set, prerecorded voice messages, such as greetings, system instructions, and/or system state announcements that are selectively played to the callers or the system subscribers. A call progress tone (CPT) card 47 includes a set of components that generate various audio tones that are selectively played to system subscribers and other individuals who access the system.

The overall operation of the paging terminal 28 is controlled by a central processing unit (CPU) 48. A hard drive 50 serves as the memory that contains information, such as a subscriber record 108 (FIG. 7), for each subscriber, which lists the services that the subscriber uses. The hard drive 50 also functions as the memory in which the voice messages that are left for the subscriber are stored. The writing of information into and the reading of information out of the hard drive 50 are controlled by a disk controller card (DCC) 52.

The CPU 48 and the DCC 52 are connected by a common communications pathway, referred to as the VME bus 54. A second bus, a data and control (DAC) bus 56 serves as the pathway over which data and control signals are transferred to and from the CPU 48 and the DID cards 42, the UOE cards 44, the VSB 46, and the CPT card 47. A switch card 58 serves as the interface between the VME bus 54 and the DAC bus 56. The switch card 58 converts the signals passing over each of the buses 54 and 56 into an appropriate format so that the signals can be distributed over the other bus. Digitized voice signals are transferred between the VSB 46 and the VME bus 54 over a direct-memory access (DMA) bus 60. A buffer memory interface card (BMIC) 62 provides a high-speed window between the VME bus 54 and the DMA bus 60 to allow the transfer of signals therebetween. Digitized audio signals, including voice signals, are transferred between the DID cards 42, the UOE cards 44, the VSB 46 and the CPT card 47 over a pulse code modulation (PCM) highway 64. The switch card 58 regulates the flow of data over the PCM highway 64 pursuant to instructions generated by the CPU 48.

In one preferred embodiment of the invention, each DID card 42 is capable of being connected to two trunk lines 66 that extend from the PSTN 32 to the paging terminal 28. Depending on the configuration of the particular trunk line 66, it may serve as a communications path for anywhere between 100 to 100,000 different telephone numbers. When a call is forwarded from the central office to a DID card 42, the "header" portion of the call contains signals that identify the phone number being called. This header material may be in the form of a set of distinct audio tones (dual-tone multifrequency (DTMF) pulses) or a set of on-off-on-off (rotary), pulses. Processing equipment on the DID card 42 converts the header information into a digital format. The DID card 42 transmits the header information, as part of a message announcing the call, to the CPU 48. If the CPU 48 determines that the call is to a "valid" subscriber number, the DID card 42 is instructed to establish a connection to the caller. In response to such a command, the DID card 42 answers the call to establish a connection to the caller. The DID card 42 is further provided with processing circuitry that converts the audio signals received from the caller, which are in an analog format, to a digital format. The digitized audio signals are then transmitted by the DID card 42 to other subsystems of the paging terminal 28 over the PCM highway 64. The DID card 42 is further capable of converting digitized audio signals received over the PCM highway into an analog format. The analog audio signals are distributed by the DID card 42 through the trunk lines 66 and the PSTN 32 to the telephone over which the call to the system was made in order to produce recognizable speech. In some versions of the invention, the DID cards 42 are further provided with the capability of making outgoing telephone calls. These DID cards 42 are provided with tone generators capable of generating DTMF pulses over the trunk lines 66 in order to place telephone calls to specific locations.

Figure 3:
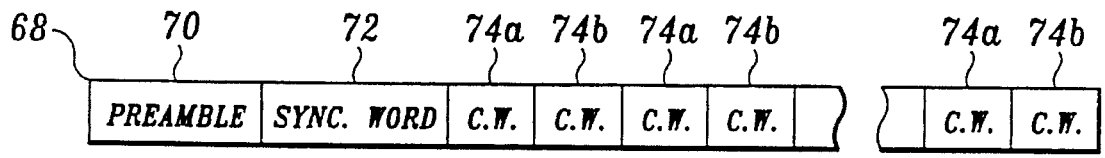
FIG. 3 illustrates the structure of a batch of pages that are broadcast by the paging system of this invention.

The UOE cards 44 generate paging signals to the paging stations 30 that are then rebroadcast as the pages 34. In one form of paging system, the paging terminal 28 assembles a block of pages 34 into a single message known as a batch 68, illustrated by FIG. 3. Each batch 68 includes a preamble message 70 that serves to identify the transmission as a paging message. A synchronization word 72 follows the preamble message 70. The synchronization word 72 comprises a set of signals that the pagers 27 in the handsets 26 use to regulate their processing circuitry so that the remainder of the batch 68 will be properly processed. Following the synchronization word 72 are a set of code words (CWs) 74. There are two types of code words, address code words 74a and data code words 74b. Each address code word 74a contains the address of the pager assigned to one specific subscriber. The data code words 74b follow the address code words 74a. The data code word 74b contains the actual page for the particular subscriber's pager. Processing circuitry inside the pager 27 monitors the received paging batches 68 for an address code word 74a that contains the address for that subscriber. When such an address code word 74a is received, the pager 27 reads the following data code word 74b for the paging data that is being sent to that subscriber. The processing circuitry in the pager 27 then generates the page based on the information contained in the data code word 74b. The data required to create some pages, such as long alphanumeric pages or voice pages, may be greater than the data that can be fitted in a single data code word 74b. In this event, it may be necessary to transmit multiple data code words 74b so that the entire page can be presented to the subscriber.

In one preferred embodiment of the invention, batches 68, except for any voice component thereof, are assembled entirely by the CPU 48 and forwarded to the various UOE cards 44. Digitized audio signals that form the voice pages are forwarded to the UOE cards 44 from the VSB 46 over the PCM highway 64. These signals are placed in the batches 68 by UOE cards 44 pursuant to commands generated by the CPU 48. Each UOE card 44 controls the forwarding of the batches 68 that are transmitted by the paging stations 30 over one particular carrier frequency. The batches 68 transmitted by any one particular UOE card 44 can, however, be transmitted to the various paging stations 30 over different communications links. For example, the batches transmitted by one UOE card 44 can be forwarded to some paging stations 30 over a radio link 138 (FIG. 1 ), over the PSTN 32, and/or over a dedicated fiber-optic transmission network (not illustrated). The UOE cards 44 forward the batches 44 to the associated paging stations 30 at a rate at which processing equipment integral to the paging stations is able to accept the information.

While in some paging terminals 28 each signal used to form a batch 68 is initially generated by the CPU 48, there is no requirement that all terminals operate in this manner. Some terminals 28 can be constructed so that the UOE cards 44 insert the preamble message 70 and synchronization word 72 on the front of each batch 68. Moreover, some UOE cards 44 can further be provided with means for producing tone signals that regulate some characteristic of the rate at which the paging stations 30 broadcast the pages. For example, some UOE cards 44 are capable of generating control tones that are used to establish the carrier frequencies over which the pages 34 are broadcast. Certain UOE cards 44 can also be equipped with circuitry for generating test signals that are used to evaluate the performance of the paging stations 30.

The VSB 46 facilitates the transfer of the digitized voice signals between the DMA bus 60 and the PCM highway 64. Included on the VSB 46 are components for converting signals between the format over which they are broadcast on the DMA bus 60 and the format over which signals are broadcast on the PCM highway 64. The VSB 46 also includes a set of buffers in which the voice signals are temporarily stored before they are distributed over the DMA bus 60 or the PCM highway 64. Typically, messages for a subscriber's mailbox are first stored in the VSB buffers prior to the forwarding of the messages to the hard drive 50 over the DMA bus 60. When messages are retrieved for play, or retrieved for transmission as a voice page, they are also first stored on the VSB buffers prior to their broadcast over the PCM highway 64. Some messages, such as notices a subscriber wants broadcast or customized greetings that are generated by a subscriber, can consist of multiple-message segments. When such messages are to be played, the individual message segments are first concatenated in the VSB buffers. Once the complete message has been assembled, it is broadcast over the PCM highway 64 to the appropriate destination.

The VSB 46 further includes a section of memory in which standard system messages are always stored. These messages include system greetings, instructions and/or mailbox status information that is frequently played out to system subscribers and other individuals who access the paging system. These messages are contained in the system hard drive 50. When the paging terminal 28 is initialized, these messages are uploaded into the VSB 46 for quick access. The distribution, or play, of these messages is controlled by commands generated by the CPU 48.

The CPT card 47 contains a set of circuits for generating a number of audio tones that can be selectively played when an individual calls the system. One form of CPT 47, for example, is capable of generating five distinct tones. A ring tone can be generated in order to give the caller the impression that the paging terminal 28 is in the process of completing some portion of the call. A busy tone is generated to inform the caller that, for some reason, the call cannot be completed. An answer tone can be generated to serve as an instructionless announcement that the caller can enter commands into the system. In other words, the answer tone is generated to inform system subscribers and other knowledgeable individuals that a set of commands or data must be entered in order for the operation of the system to proceed. Usually commands are entered into the paging terminal 28 by "overdialing," which is the act of generating one or more DTMF or rotary pulses after the call has been connected. The processing equipment on the DID cards 42 decodes the commands and broadcasts them to the CPU 48 over the DAC bus 56. Another tone the CPT card 47 generates is an accept tone. The accept tone is played to a caller upon the entry of a voice message or overdial instructions to acknowledge entry of the message or the instructions. In versions of the system wherein there is an operator station (not illustrated), connected to the paging terminal 28, the CPT card 47 is further capable of generating an operator-alert tone to inform an attendant that someone needs assistance or that there is a voice message that needs to be transcribed into an alphanumeric page.

In one preferred embodiment of the invention, the switch card 58 performs three functions. Specifically, the switch card 58 includes a clock circuit that generates the master clocking signal to which all the other subunits of the paging terminal 28 are synchronized. The switch card 58 also includes conversion circuitry that facilitates the exchange of signals between the VME bus 54 and the DAC bus 56.

The third function executed by the switch card 58 is the control of digitized voice-signal transfer over the PCM highway 64. The relationship of the PCM highway to the other components of the paging terminal 28 is first described with reference to FIG. 4, which depicts the manner in which the PCM highway is connected to a DID card 42. The PCM highway 64 actually is a collection of separate highways, identified as 64a, 64b, 64c, and 64d. Two of the individual highways, highways 64a and 64b, are transmit highways; the subunits of the paging terminal 28 that broadcast digitized audio signals, the DID cards 42, the VSB 46, and the CPT card 47, do so over these highways. The other two individual PCM highways, highways 64c and 64d, are receive highways; the subunits of the paging terminal 28 that receive digitized audio signals, the DID cards 42, the UOE cards 44, and the VSB 46, do so over these highways. Signals are selectively broadcast and received over the individual PCM highways 64a, 64b, 64c, and 64d by a process of time-division multiplexing. As illustrated diagrammatically by FIG. 5; a particular period of time can be thought of as a frame 79 divided into a number of time slots 80a, 80b, 80c, ... 80n. In one version of this invention a frame 79 is a 125-microsecond time period that is divided into 32 time slots 80, each 3.9 microseconds in length. The digitized audio signals are transmitted between the subunits of the paging terminal 28 in the form of digitized words, wherein one or more words are transmitted to or from a particular subunit over a specific individual PCM highway 64a, 64b, 64c, or 64d in a particular time slot 80a, 80b, 80c, ... or 80n. For example, for one particular call, a DID card 42 may transfer a voice-mail message to the VSB 46 over highway 64b in time slot 80 number 17. During the same time frame 79, the VSB card 46 receives the voice-mail message over individual highway 64c in time slot 80 number 25.

Figure 4:
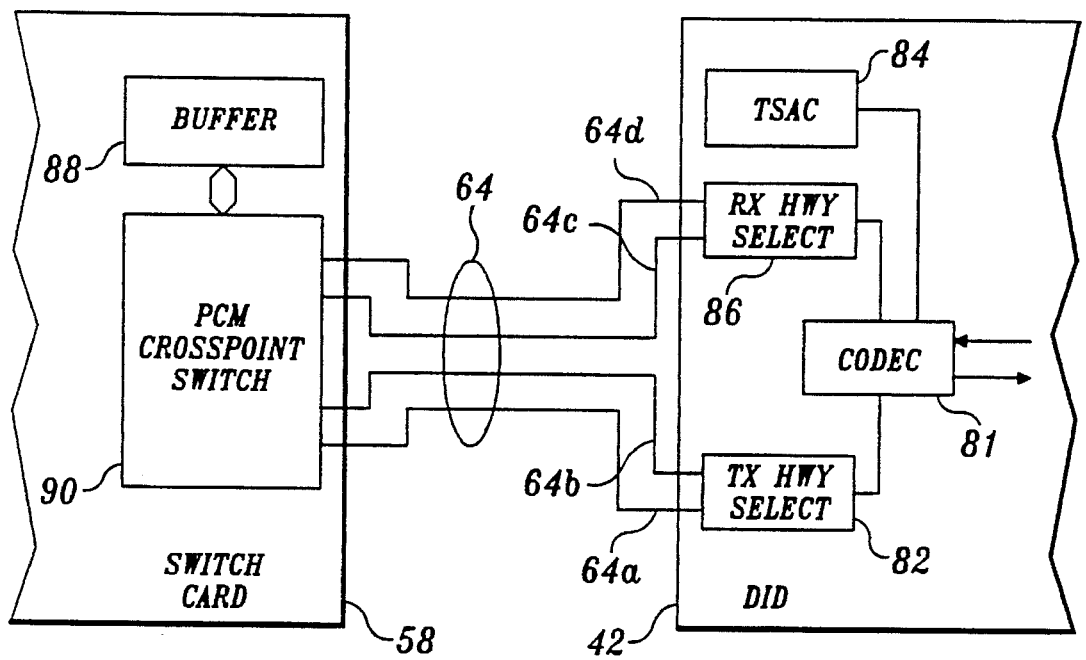
FIG. 4 is a detailed block diagram view illustrating how a pulse code modulation (PCM) highway connects the various subunits of the paging system of this invention to allow the transfer of digitized voice signals therebetween.
Figure 5:
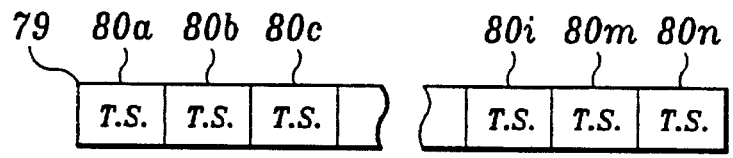
FIG. 5 illustrates how, by time-division multiplexing, signals from multiple conversations are exchanged simultaneously over one of the individual PCM highways of this invention.

The transmission and reception of the digitized audio signals over the individual PCM highways 64a through 64d are facilitated on each of the paging terminal subunits by the signal-select circuitry shown in FIG. 4 for a DID card 42. The circuit includes a CODEC 81, which is a coder/decoder capable of converting analog audio signals, voice signals from a caller, into a digital format and digital signals into analog signals. The digitized output signals from the CODEC 81 are applied to a transmit highway (TX HWY) select circuit 82 to which the individual PCM transmit highways 64a and 64b are connected. The transmit highway select circuit 82 is a 2:1 multiplexer that selectively applies the output signals from the CODEC 81 to either one of the individual PCM transmit highways 64a or 64b. The actual time or, more particularly, the time slot 80, in which the CODEC 81 transmits signals over one of the PCM transmit highways 64a or 64b is controlled by a time slot assignment circuit (TSAC) 84. The TSAC 84 regulates when the CODEC 81 transmits digitized output signals so that they are inserted in the correct time slot 80a, 80b, 80c, ... or 80n. The PCM transmit highway selections established by the transmit highway select circuit 82 and the time slot transmission commands generated by the TSAC 84 are based on control signals generated by the CPU 48.

Digital voice signals received over the individual PCM receive highways 64c and 64d are processed in a similar manner. A receive highway (RX HWY) select circuit 86, another 2:1 multiplexer, selectively applies the signals from either one of the individual PCM receive highways 64c or 64d to the CODEC 81. The TSAC 84 regulates the time periods or, more particularly, in which time slot 80a, 80b, 80c, ... or 80n the CODEC 81 converts the incoming digital signals into analog signals suitable for replay to a conventional telephone. The time slot selections made by the TSAC 84 and the PCM receive highway connections established by the receive highway select circuit 86 are based on control signals generated by the CPU 48.

The switch card 58 facilitates the exchange of digitized voice signals over the individual PCM highways by transferring information from the PCM transmit highways 64a and 64b to the PCM receive highways 64c and 64d. As depicted in FIG. 4, the switch card 58 includes a buffer 88 to which the individual PCM highways 64a, 64b, 64c, and 64d are connected and a cross-point switch 90 that is connected to the buffer. The buffer 88 temporarily stores the digitized voice signals that are supplied to and transmitted from the switch card 58. The cross-point switch 90 transfers the digitized voice signals from a time slot 80a, 8b, 80c, ... or 80n in any one of the individual PCM transmit highways 64a or 64b to a time slot in one of the individual PCM receive highways 64c or 64d. The cross-point switch 90 performs the signal transfers based on instructions received from the CPU 48.

The CPU 48 includes a microprocessor (μP) 92 that controls the overall operations of the paging terminal 28. The CPU further includes a memory 94 that contains instructions that are executed by the microprocessor 92 and data that are used by and/or generated by the microprocessor. In one preferred embodiment of the invention, a Motorola® 68030 32-bit processor is employed as the microprocessor 92. The memory 94 includes 32M bits of memory integrally associated with the microprocessor 92 and another 64M bits of memory located on a separate memory card.

The tasks, or programs, that are selectively executed by the CPU 48 to control the paging terminal 28 are described with reference to FIG. 6. Before discussing the individual tasks in detail, it should be understood that the microprocessor 92 is provided with an operating system that allows multitasking, wherein the execution of multiple tasks can be interleaved with each other. Moreover, as described hereinafter, there is a priority under which the microprocessor 92 will determine which new task will be executed first. The task prioritization levels are further used to evaluate whether or not a new task that needs to be performed is of such importance that its execution should interrupt the task that the microprocessor 92 is currently executing.

Generally, the CPU 48 performs application tasks 98 and support tasks 100. The application tasks 98 are the tasks that control the actual call interconnections, message storage and replay, and page generations that are performed by the paging terminal 28. The support tasks 100 are the underlying tasks that make execution of the application tasks 98 possible. The support tasks 100 include the control of any printers, operator terminals, or other input/output devices that are connected to the terminal 28 and the generation of data on these devices. Other support tasks include interface tasks that control interfaces to be established between the paging terminal 28 and other devices, such as alphanumeric paging attendant terminals, and/or other paging terminals. Other support tasks 100 generate reports regarding the operation of the paging system and handle the processing of errors. The structure of the above support tasks is generally known by those familiar with data-processing equipment and will not be further described.

A support task 100 of particular relevance is the PCM highway manager 102. This task controls the digitized voice-signal transfers that occur over the PCM highway 64. Specifically, the PCM highway manager 102 maintains a set of tables (not illustrated) for each individual PCM highway 64a through 64d indicating the availability of time slots 80a, 80b, 80c, ... and 80n for that highway. The PCM highway manager 102 receives indications from other tasks, typically application tasks 98, that there is a need to have a digitized voice signal path between two paging terminal subunits. In response to this indication, the PCM highway manager 102 determines in which available time slot 80a, 80b, 80c. ... or 80n and over which one of the individual PCM transmitting highways 64a or 64b the transmitting subunit should forward the digitized voice signals. The PCM highway manager 102 also determines in which time slot 80a, 80b, 80c. .. or 80n and over which individual PCM receiving highway 64c or 64d the receiving subunit should receive the digitized voice signals. The PCM highway manager 102 then directs the microprocessor 92 to generate control signals to the appropriate transmit highway select circuit 82, the appropriate receive highway select circuit 86, the appropriate TSACs 84, and the cross-point switch 90 so that signal transfer will take place over the designated highways 64a, 64b, 64c, or 64d in the designated time slots 80a, 80b, 80c, . . . or 80n.

The applications tasks 98 include a trunk task 104. The trunk task is responsible for servicing all incoming calls made into the paging system 28 and for generating any outgoing calls the system makes if the system has call-generating capabilities. The trunk task services incoming calls by referring to a subscriber library 106, now described with reference to FIG. 7. The subscriber library 106 contains a set of subscriber records 108, each of which is associated with a separate subscriber. Each subscriber record 108 includes a public number (Pub. No.) field 110, which allows the record to be identified by the subscriber's public number. In some versions of the invention, the public number field 110 may be the subscriber's actual public number. In other versions of this invention, the CPU 48 may maintain a library of subscriber public numbers, each of which further includes a pointer that indicates where the subscriber record 108 of that particular subscriber is located. The subscriber record 108 includes a service field 112 that identifies the particular paging service to which that individual subscribes. An individual may subscribe to one or more of the basic paging services: tone paging, numeric paging, alphanumeric paging, voice paging, and/or voice mail. There is a further set of feature fields (FFs) 114a through 114e that indicate if the individual subscribes to certain features that are associated with his general services. One feature field, for example, indicates if the subscriber has a customized greeting that he has recorded to invite callers to leave a message. There is a feature field to indicate if a subscriber is a page-connect subscriber. Another feature may indicate if the subscriber has a page-connect overdial authorization. This feature requires a caller to overdial an access code before the trunk task 104 will initiate the page-connect paging process. The information contained in the feature fields 114a through 114e further includes pointers that indicate where relevant data about that subscriber may be found. For example, the feature field for customized greetings will contain a pointer that leads to an address on the hard drive 50 where the subscriber's customized greetings can be found. The feature field for page-connect overdial authorization will contain an indication of where that subscriber's private overdial access code is located. Each subscriber record 108 further includes a cap code (CC) field 116 and an encoding (ENC) field 118. The cap code field 116 contains the identification number, the address of the pager 27, assigned to that subscriber. The encoding field 118 indicates the coding format for the pages 34 that are to be broadcast to the pager 27.

Subscribers who use the page-connect service and certain other subscribers will further have a private number (Priv. No.) field 120. The private number field 120 identifies a private phone number that is assigned to the subscriber. The subscriber records for these subscribers may also include a page-connect availability feature field, for example, feature field 114e. The page-connect availability field 114e contains an indication of the particular subscriber's willingness to accept page-connect pages as opposed to other pages. The subscriber can enter commands into the paging terminal 28 to change the state of the page-connect availability field 114e to indicate his/her willingness or unwillingness to accept page-connect pages.

It should be understood that the foregoing description of a single, monolithic subscriber record 108 is illustrative and not meant to be limiting. The various fields may each be located in their own libraries that can be accessed by reference to pointers located in the subscriber record 108. Some fields may even be grouped together in their own library. For example, there may be a page-connect page library. This library would contain both the private number fields 120 and the page-connect availability fields 114d for each page-connect subscriber. The individual records in these libraries would be accessed by reference to an address that is associated with both the subscriber's public telephone number and the subscriber's private telephone number.

The trunk task 104 performs page-connect paging by reference to a trunk pair table 119 depicted by FIG. 8. Trunk pair table 119 maintains a trunk pair record 121 for each page-connect call the paging terminal 28 is currently processing. Each record 121 includes a public trunk field 122, a private trunk field 123 and a resources allocation field, represented as a single field 124. The public trunk field 122 contains the public number of a subscriber for whom a page-connect page has been or will be generated. The private trunk field 123 contains the private number of the subscriber. The resource allocation field 124 contains an indication of the PCM highway resources that are used to established a fully duplexed audio signal link between the caller and the subscriber. As will be described, each trunk pair record 121 is formed during the processing of a call to a page-connect page subscriber.

By reference to the subscriber record 108 and the trunk pair table 119, the trunk task 104 processes incoming calls to the paging system. Based on the telephone number forwarded to the CPU 48 by the DID card 42, the trunk task 104 initially determines if it is a valid call to an authorized system subscriber and if the call is from the subscriber's public telephone number or his/her private telephone number. If the call is over an invalid telephone number, a number not assigned to any particular subscriber, the trunk task 104 will arrange for the retrieval and play of a message indicating that the caller dialed an invalid number and then disconnect the call. If the call is over a subscriber's public phone number, the trunk task will play the appropriate messages that the subscriber designated for his services. For example, if the paging system is functioning as a voice-mailbox, the trunk task will play an appropriate greeting to invite the caller to leave a message. If the system serves as a pager, the trunk task 104 will invite the caller to leave a page by overdialing data or, for alphanumeric and voice pages, by leaving a message. If the called system customer is a page-connect page subscriber, the trunk task will execute a page-connect task 126, described in detail hereinafter, to try to connect the caller with the subscriber. If the caller has accessed the paging terminal 28 to page a subscriber, the trunk task 104 will generate a page request 130 (FIG. 9), which is an instruction directing the formation of a page for transmission to the subscriber. Each page request 130 includes a pointer that indicates where the necessary information to create the page can be found. The pointer integral with the page request 130 may, for example, indicate the address of the subscriber record 108 for the subscriber. As described hereinafter, another task running on the central processing unit 48 accesses the subscriber record 108 for the information necessary to create the page for the subscriber.

The trunk task 104 may also include a caller option task 125 or a subscriber option task 133. As described hereinafter, the caller option task 125 allows the caller to proceed with the generation of the page-connect page in anticipation of being connected to the subscriber or having the call routed to another destination such as subscriber's voice mailbox or secretary. The subscriber option task 133 identifies the caller to the subscriber as part of the page-connect process and then gives the subscriber the options of accepting the call, routing the call to another destination, or disconnecting the call.

If the caller is a system subscriber, then, based on overdial commands entered by the subscriber, the mink task 104 will initiate the replay of stored messages to the subscriber. Alternatively, depending on the commands that have been entered, the trunk task may collect messages left by the subscriber and distribute them to other parties. If the caller is a subscriber who uses the page-connect page service, the trunk task 104 initially references the trunk pair table 119 to determine if it includes a trunk pair record 121 that contains a private trunk field 123 with that subscriber's private number. If there is such a record 121, the trunk task 104 will connect the subscriber to the caller.

Pages are actually created by a queuing and coding (Q & C) task 128. The queuing and coding task receives the page requests 130 from the trunk tasks 104. Based on the pointer that is integral with the page request 130, the queuing and coding task 128 accesses the subscriber's record 108 and, based on the information contained therein, actually generates the page. The queuing and coding task 128 also places the page into the appropriate format so that the page can be properly processed by the processing equipment contained in the pager 27. The queuing and coding task 128 further groups pages together in batches 68.

Figure 9:
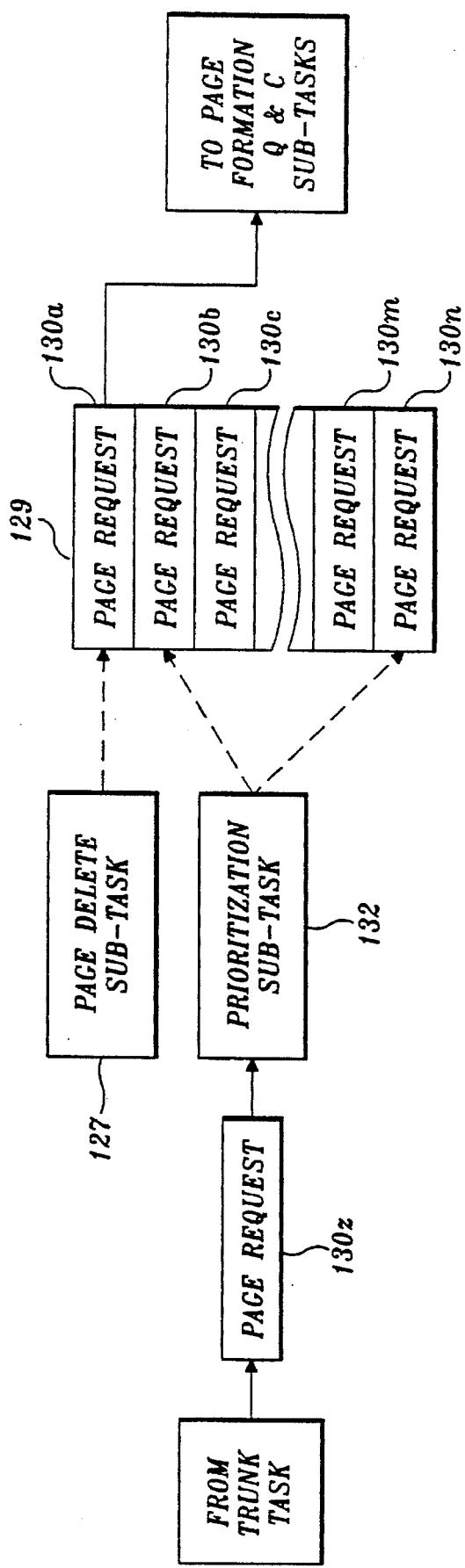
FIG. 9 illustrates a list of paging requests that is maintained by the paging system of this invention and further illustrates the manner in which new pages are placed in the list by a prioritization subtask.

As part of the page formation process, the queuing and coding task 128 maintains a list 129 of paging requests 130a, 130b, 130c. . . and 130n, depicted by FIG. 9, for pages that need to be created. The page requests 13 0a through 130n are processed in the order of their locations on the list 129, wherein the first page request 130a is processed first. The page requests 130 are placed on the list 129 by a prioritization subtask 132, which is a subtask of the queuing and coding task 128. Normally, the prioritization subtask 132 places a newly received paging request 130z on the bottom of the paging request list 129. However, if header information contained in the new paging request 130z indicates that the request is for a page-connect page, the prioritization subtask 132 places that request on the page request list 129 at the head of all the non-page-connect page requests, after the last-created page-connect page request 130. This ensures that the page-connect page is generated and broadcast first to minimize the amount of time that the caller has to wait for the subscriber to respond.

The queuing and coding task 128 also includes a page delete subtask 127 depicted in FIG. 9. The page delete subtask 127 can selectively delete page requests, as shown by arrow 131 to page request 130b. Page delete subtask 127 is selectively employed in response to commands from the trunk task 104 that there is no need to create and transmit a particular page. For example, when the trunk task 104 detects that a caller who has accessed a page-connect page subscriber has hung up before the system has generated and transmitted a page, the trunk task will direct the page delete subtask 127 to delete the page request for that subscriber. This prevents the generation of a page to a subscriber when there is no calling party waiting to connect to the subscriber.

Figure 6:
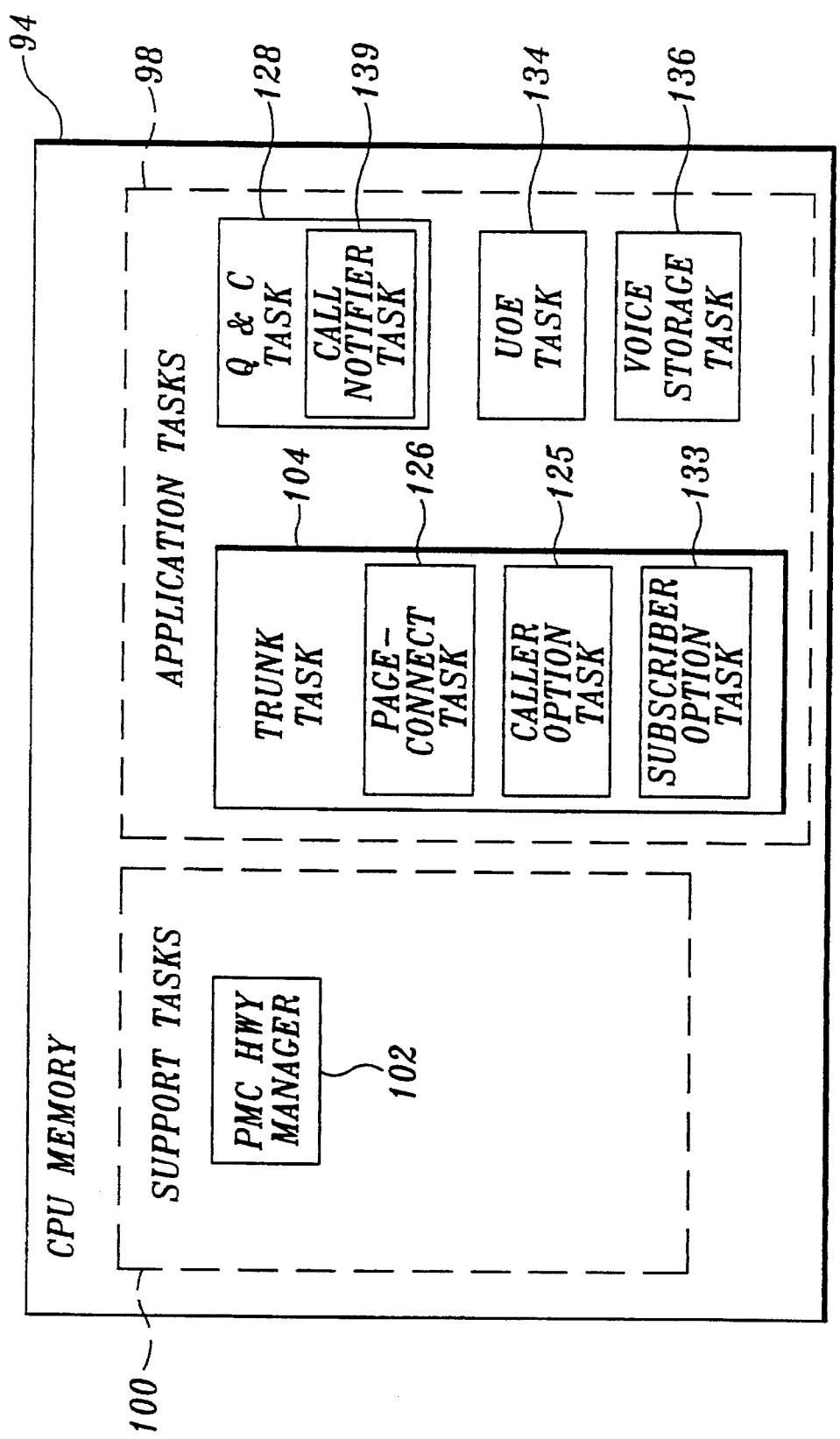
FIG. 6 is a block diagram of the various tasks that are executed by the paging system of this invention, wherein those tasks are generally illustrated in modular form.

In some versions of the invention, the queuing and coding task 128 may include a call notifier task 139 (FIG. 6). As will be described hereinafter, the call notifier task 139 selectively forwards a page to a particular destination, for example, either the subscriber's pager or an office telephone, based upon when the call is received. Versions of the system that include the call notifier task 139 are provided with DID cards 42 capable of placing outgoing telephone calls.

Pages generated by the queuing and coding task 128 are forwarded to a UOE task 134. The UOE task 134 selectively downloads the formatted pages 34 onto the appropriate UOE card 44 so that the pages can be broadcast over the appropriate paging stations 30. The UOE task 134 further receives messages from the UOE cards 44 that indicate when specific batches 68 of pages have been broadcast. When a particular page is a voice page, the UOE task 134 further sends a message-retrieve instruction to a voice storage task 136, described so that the message will be transferred from the hard drive 50 to the appropriate UOE card 44 for broadcast as a page.

The voice storage task 136 performs all transfers of digitized voice signals between the VSB 46 and the hard drive 50. The voice storage task 136 prevents conflicts between individual subtasks that are being executed and that share the same stored voice signals. The voice storage task 136 is further set to control the storage and retrieval of digitized voice signals so that the DCC 52 is as efficient as possible; this reduces bottlenecks that could otherwise occur as pan of the storage and retrieval process.

The central processing unit 48 executes the trunk task 104 before performing any other tasks. In other words, the processes performed by the trunk task 104 are considered to have the highest priority. The second highest priority processes are the message storage and retrieval processes performed by the voice storage task 136. The forwarding of pages by the UOE task 134 is the next highest priority task to be executed. The lowest priority application processes are those associated with the formation of the pages and forwarding batch 68 performed by the queuing and coding task 128. The ancillary support tasks 100 that are not directly associated with the processing of calls to the paging terminal 28 are the lowest priority tasks and are executed last by the central processing unit 48. These tasks 100 include tasks associated with printing maintenance and system operation tasks.

Referring again to FIG. 1, additional detail regarding the paging system is set forth. After the batches 68 of pages 34 are created, they are forwarded to the individual paging stations 30. As shown diagrammatically, the pages may be forwarded over a radio link, through the PSTN 32, or by any other convenient communications means. For example, in some paging systems, the pages may be sent to the individual paging stations 30 over a microwave relay network. Once a batch 68 of pages 34 is received at the paging stations 30, it is broadcast for reception by the pagers 27.

The CT-2 portion of the telecommunications system of this invention is also described with respect to FIG. 1. The "fixed" part of the CT-2 system is the base stations 36. Each base station 36 comprises a transceiver, approximately 0.5× 1.0×2.0 meters in size, which is contained in a weatherproof housing to facilitate its mounting outdoors. Each base station 36 is further connected to the PSTN 32. Each base station 36 includes processing circuitry to read header information transmitted by the handset 26. The processing circuitry uses this information to place a call to the party being accessed by the subscriber. The header information is further used by the base station 36 to identify the subscriber so that appropriate billing information can be forwarded to a billing office (not illustrated). One such base station 36 is the Concept 2030 manufactured by GPT Telepoint, Coventry, United Kingdom.

A suitable CT-2 handset 26 is the Concept 2000, also manufactured by GPT Telepoint. In current CT-2 systems, a typical handset 26 can be used to exchange signals with a base station 36 that is within a range of approximately 200 to 400 meters. The handset 26 of this invention further includes an autodial function. This function causes the handset 26 to automatically dial and transmit a specific number, the subscriber's private number, when the subscriber presses a specific button (not illustrated) on the handset.

The handset 26 of the telecommunications system of this invention includes a pager 27 designed to receive pages 34 from the paging stations 30. A suitable pager 27 that can be built into the handset 26 is the Bravo™ pager manufactured by Motorola of Schaumburg, Ill. In order to ensure that the handset transceiver and the page receiver do not interfere with each other's operation, they are selected to operate at substantially different frequencies. In one preferred version of this invention, the handset 26 and CT-2 base stations 36 exchange signals at frequencies between 864 and 868 MHz. and the pager 27 receives pages 34 from the paging stations 30 at approximately 150 MHz.

The flow charts of FIGS. 10A through 10E illustrate the manner in which the telecommunications system of this invention is used to offer page-connect paging services to the system subscribers. Initially, the paging terminal 28 receives an incoming call over a subscriber's public phone number as indicated by a call-receive step 152. In the call-receive step 152, the DID card 42 over which the call is received initially forwards the "incoming" telephone number to the CPU 48. The trunk task 104 is executed to determine if the number is valid and if it is the subscriber's public number or private number. During this time, trunk task 104 directs the CPT card 47 to generate a ring signal that is played to the caller.

After it is determined that the call is to a subscriber's public telephone number, the trunk task 104 determines if the subscriber is a page-connect subscriber as indicated by step 154. This evaluation is performed by reading the subscriber-record service fields 114a to 114d to determine the features to which the particular individual subscribes. If the indication is that the individual is not a page-connect subscriber, the trunk task 104 proceeds to invite the caller to use one of the other services, i.e., paging or voice-mail, that the subscriber selected, as depicted by an execute-other-services step 155. If the subscriber is a page-connect page subscriber, the page-connect task 126 is executed. Based on the information contained in one of the other subscriber-record feature fields, the page-connect task 126 determines if the subscriber has a private access code, as represented by step 156. If the subscriber does not have this feature, the page-connect task 126 proceeds with the page-connect process. If the subscriber has this feature, the page-connect task 126 waits a selected time for the appropriate access code to be entered, represented by step 158. In some versions of the invention, the caller's cue to enter the access code will be the play of the answer tone by the CPT card 47. In other versions of the invention, the cue may be an innocuous message such as "Leave your message now" that is played to the caller. If the caller does not enter the correct access code, the page-connect task 126 ceases to execute and the trunk task 104 performs the execute-other-services step 155.

If the correct access code is entered, the page-connect task 126 continues to execute. The page-connect task then determines if the paging system is currently handling a preselected maximum number of page-connect pages as represented by step 164. This evaluation is made because, even though the paging terminal 28 is capable of handling a large number of page-connect calls, the trunk lines 66 connected to the terminal from the PSTN 32 may not be able to handle both large numbers of page-connect calls and calls that are paging requests and/or voice-mail messages to other system subscribers. Accordingly, in order to prevent monopolization of the paging system by page-connect subscribers and their callers, a determination is made as to whether or not the system is currently processing the maximum number of page-connect pages. For example, a system with 10,000 subscribers, of whom 1,000 are page-connect subscribers, can be configured so that at any given time there are only 10 to 20 page-connect call interconnections. This determination is made by reviewing how many page-connect calls the system is currently handling as indicated by the count contained in a page-connect page count field (not illustrated). If the system is processing the maximum number of page-connect pages, the system terminates execution of the page-connect task 126 and proceeds to an alternative-services step 166. In the alternative-services step 166, the system will generate a "We are unable to connect to your party at this time" message to the caller, and then offers to generate a conventional page and/or invites the caller to leave a voice-mail message. After the caller has taken advantage of the alternative-services step 166, the call is disconnected.

If the paging system still has the capability of handling additional page-connect pages, the page-connect task 126 initially performs a page-connect page count-increment step 168. In step 168, the page-connect task increments by one the count stored in the page-connect page count field. This field is incremented immediately after the maximum-number-of-pages determination step 164 because, if the system was processing one less than the maximum number of page-connect pages, then the immediate incrementation of the counter prevents later callers from establishing page-connect pages, which would result in the monopolization of the system.

The page-connect task 126 then performs a subscriber-availability determination, represented by step 170. This evaluation is a two-part test. Initially, the page-connect task reviews the subscriber's page-connect call availability field 114e to establish whether or not the subscriber is willing to accept a page-connect page. The page-connect task then reviews the trunk pair table 119 to determine if one of the trunk pair records 121 contains a public trunk field 122 with the subscriber's public number. If there is such a record 121, it is an indication that the subscriber already has a page-connect call waiting or is actually engaged in a page-connect call. In step 172, the page-connect page count field is decremented by one to indicate that the system is capable of handling an additional page-connect page. The system then ceases to execute the page-connect task 126 and proceeds to the alternative-services step 166.

Figure 10A:
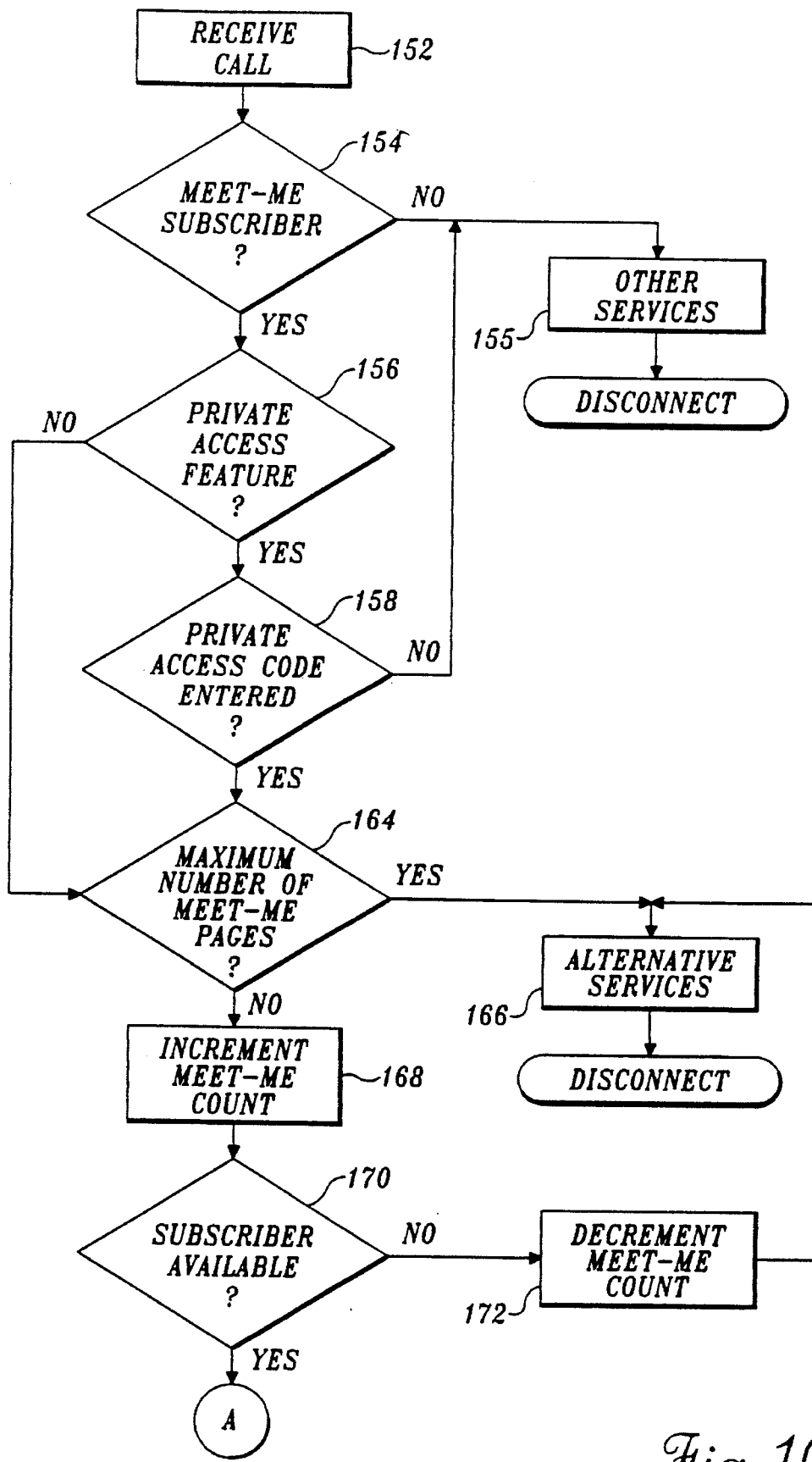
FIGS. 10A through 10E, taken together, represent a flow chart depicting the steps performed by the paging system of this invention in order to connect a page-connect paging system subscriber with an individual calling the subscriber.
Figure 10B:
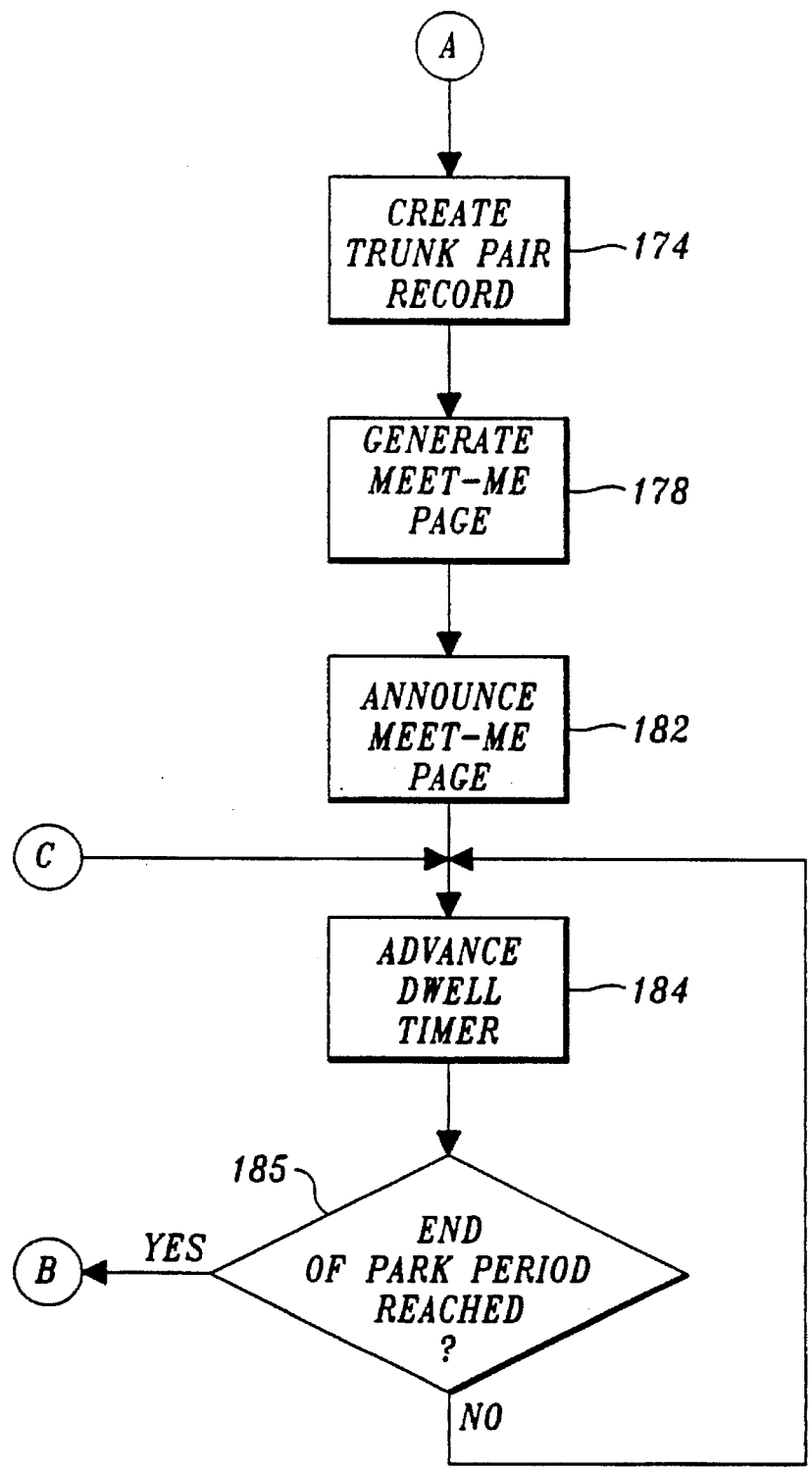

If the results of subscriber-available step 170 indicate that the subscriber is available to accept a page-connect page, the central processing unit 48 creates a new trunk pair record 121 in the trunk pair table 119 as represented by step 174 (FIG. 10B). When the new trunk pair record 121 is written into the table 119, the subscriber's public number is written into the public trunk field 122 and the subscriber's private number is written into the private trunk field 123.

After the execution of the above-described steps, the system is ready to proceed to a generate page-connect-page step 178, as will be described hereinafter. There may be a slight pause in the execution of the page-connect task 126 before step 178 is performed so that overall there will be a delay of approximately three to five seconds between the initial receipt of the call and the generation of the page. This delay is to give the caller an opportunity to hang up or overdial a request to enter a voice message and/or a page other than a page-connect page. This time delay may be established by the system operator and, thus, is the same for ever,/subscriber. Alternatively, it may be set by the subscriber. In the latter case, each page-connect page system subscriber record field 108 will include one or more feature fields 114a through 114d, which indicate the delay-before-page time period for the associated subscriber. In this case, this field is read (step not shown), during the execution of the page-connect task 126 to determine when the page-generate step 178 should be performed.

In the page-generate step 178, the page-connect task 126 directs the trunk task to send a page-connect-page page request to the queuing and coding task 128. Upon receipt of the page request, the prioritization subtask 132 reads the page request 130z and recognizes that the request is for a page-connect page and that the request should be handled immediately. The prioritization subtask 132 places that request before any previously generated non-page-connect page requests 130 that may already be in the page request list 129 so that it receives priority processing by the other sections of the queuing and coding task 128. If, prior to the generation of the page, the caller hangs up, the trunk task directs the page delete subtask 127 to remove that page request 130 from the page request list 129. The trunk pair record 121 for that call is erased, the page-connect page count field is decremented, and the page-connect task 126 stops executing.

Once a page request 130a makes it to the head of the page request list 129, the other sections of the queuing and coding task 128 generate the page and forward it to the UOE task 134. The UOE task 134 then downloads the page into the appropriate UOE card 44. The UOE card 44, in turn, forwards the page to the paging stations 30. The page is then broadcast for reception by the pager 27 in the subscriber's handset 26 as represented by a transmit page-connect page step 180.

During the first 30 to 40 seconds of the caller's phone call, the period of time in which the page is formed and first transmitted to the paging stations 30, the paging terminal 30 directs the CPT card 47 to generate a ring signal. This is to provide the caller with the normal "ringing" sound one hears while waiting for a called party to pick up the phone. After this initial period, if the subscriber has not responded, the CPU 48 will execute a page-announce step 182. In this step 182, the page-connect task directs the play of a "Please wait for your party to connect" message or a customized message. This message is generated to inform the caller that the system has generated a page in response to his/her call to the subscriber. After the play of this message, the system will continue to play a ring tone, or play music to the caller, to provide an indication that the caller is still connected to the system.

Figure 10C:
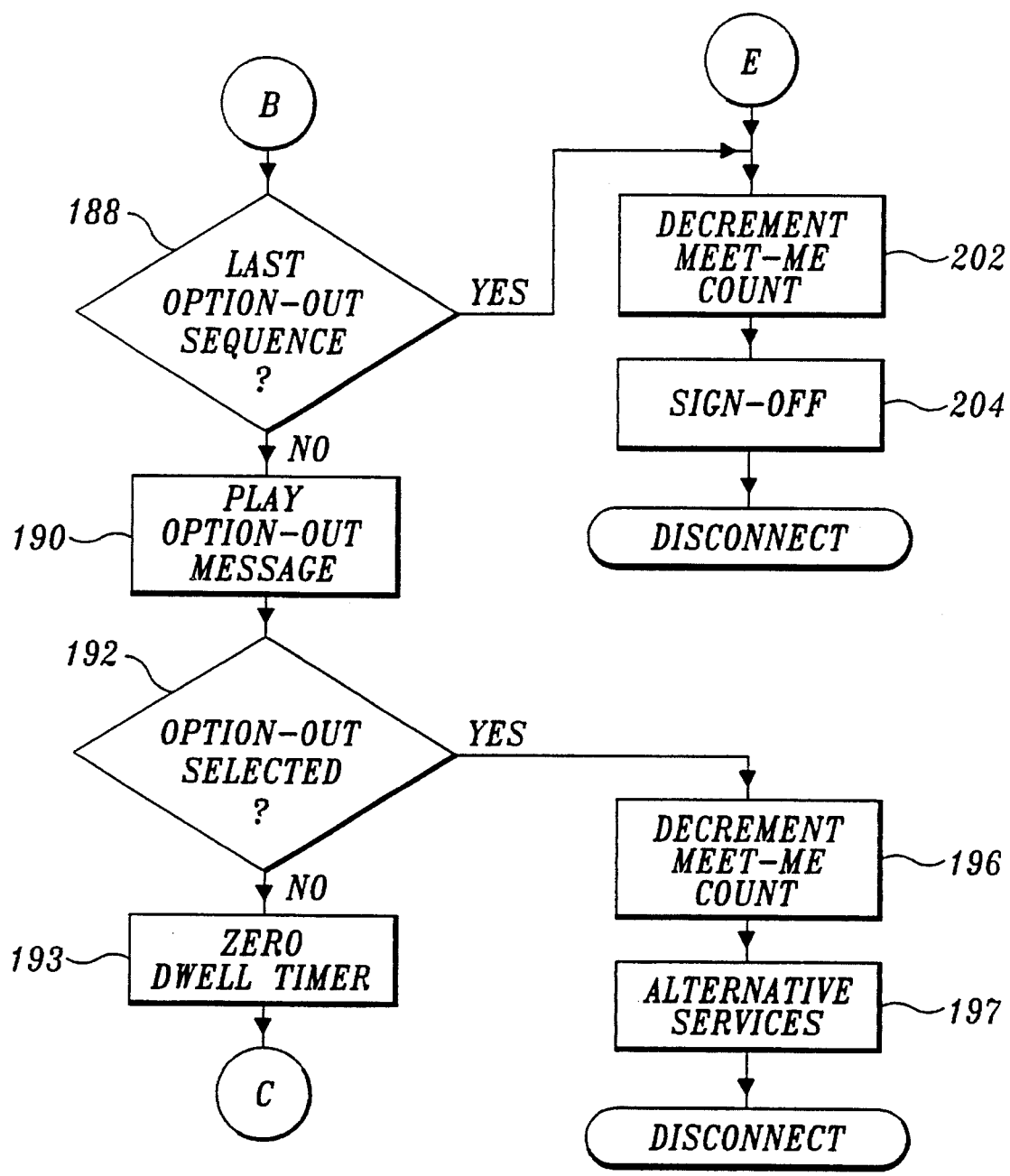

While the caller is waiting for the subscriber to respond, the page-connect task 126 monitors how long the caller has been waiting, or "parked," represented by step 185. This monitoring is based on the elapsed time as indicated by a dwell timer that is constantly advanced as indicated by step 184. The timer along with a companion option-out field (not illustrated), are initially set to zero when a page is first generated. When the end of a park period is reached, an option-out sequence is initiated. The option-out sequence, as depicted by FIG. 10C, starts with a determination of the number of times the sequence has been executed as represented by step 188. In step 188 the count contained in the option-out field is compared to a maximum count value maintained by the page-connect task 126. If the system has performed the sequence less than the maximum number of times, the system performs a play-option-out message step 190. In this step 190, the page-connect task directs the system to play a "Please continue waiting or press * to leave a message" message to the caller. This informs the caller that he can continue waiting or simply leave a message. The system then monitors the line, as represented by step 192, to determine if the caller has pressed "*" to leave a message. The dwell timer is also set to zero, as represented by step 193, and the advancement sequence is repeated.

If the caller elects to leave a message, the system will initiate an exit procedure that starts with a page-connect page count-decrement field step 196, wherein the page-connect page count field is decremented. The system then erases the trunk pair record 121 for the call in the trunk pair table 119, stops executing the page-connect task 126, and performs an alternative-services step 197 wherein the caller is invited to leave a voice message.

If the caller is on the last option-out sequence, as indicated by the maximum-play determination step 188, the system proceeds to a sign-off sequence, which starts with a page-connect page count-decrement field step 202 during which execution of the page-connect task 126 stops. The system then proceeds to a sign-off step 204. In this step 204, the system plays a message informing the caller that the paged subscriber has not responded and gives the subscriber one last opportunity to leave a voice-mail message. Also in step 204, the trunk pair record 121 for the call in the trunk pair table 119 is erased. After any message is left, the call is disconnected.

How any particular pager 27 responds upon receiving a page-connect page will depend upon the construction of the particular pager. A tone pager 27 will generate a specific sequence of tones or a single, specific, tone to indicate a page-connect page has been received. The display on a numeric or alphanumeric pager 27 will present a preconfigured message indicating that a page-connect page has been received. A page-connect page sent to a voice pager 27 will actually be a short message that is played to the subscriber to announce the page. Upon receipt of the page-connect page, if the subscriber so desires, he can call the paging system so as to be connected to the calling party. If the subscriber has a CT-2 handset 26, all that is necessary to call the paging system is to press the autodial button on the handset. The CT-2 system will then connect the subscriber to the paging terminal over his private subscriber's telephone number through the PSTN 32.

Figure 10D:
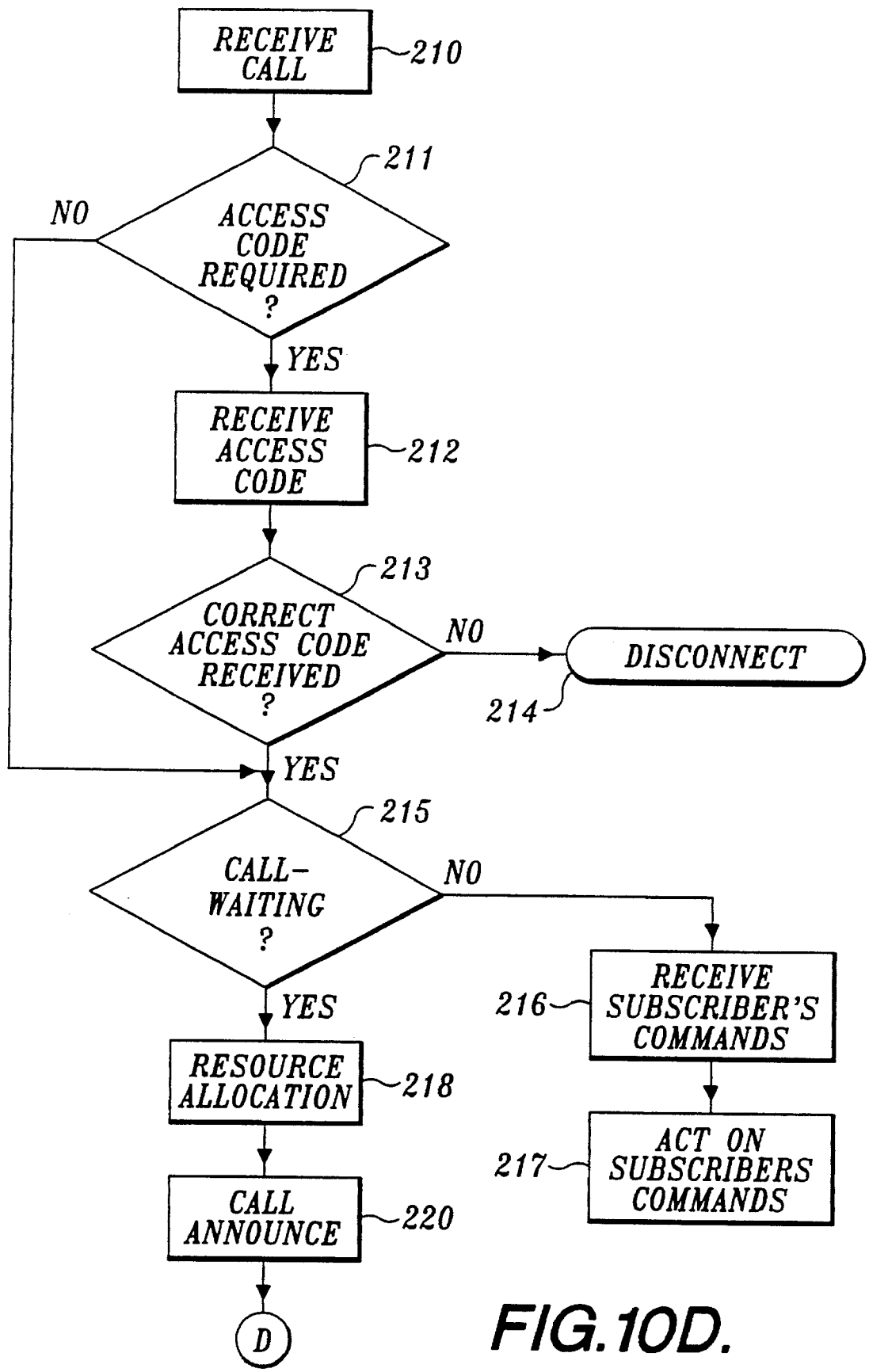
Figure 10E:
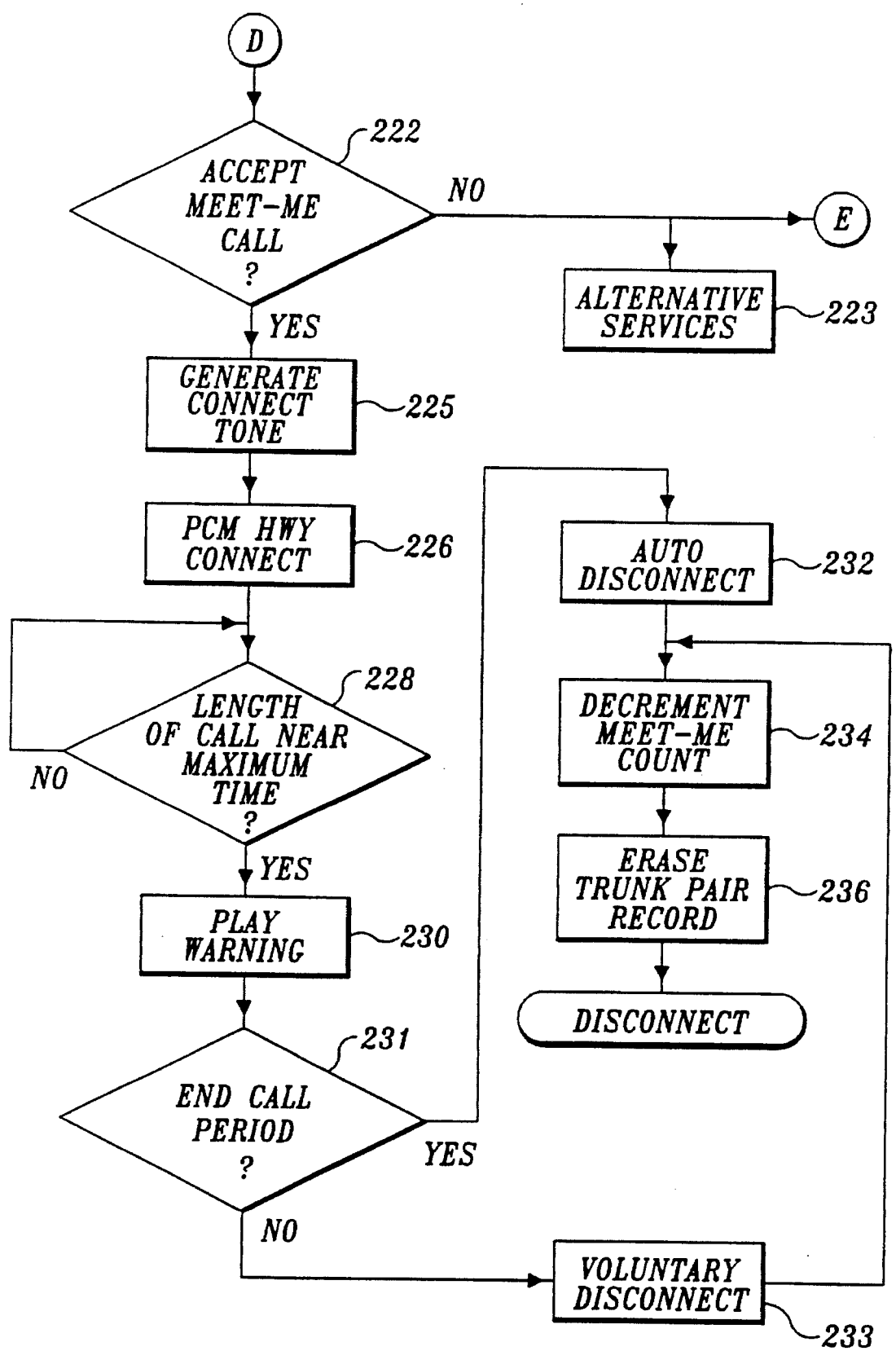

As represented by the receive-call step 210 in FIG. 10D, upon receipt of the subscriber's telephone call at the paging terminal 28, the trunk task 104 handles the call in the regular manner. By reviewing the subscriber records 108 and, in particular, the private number fields 120, the trunk task determines that the call is from a subscriber over his/her private line. The trunk task 104 then determines if entry of an access code is required to continue a call as represented by step 211. In step 211, by reference to the appropriate feature field 114a, 114b, 114c, or 114d, the trunk task 104 determines if the subscriber has the system configured so that it is necessary to enter an access code before continued use of the system over the private number can proceed. If it is necessary to enter an access code, the mink task 104 waits for the entry of the code and determines if it is the correct code, as represented by steps 212 and 213, respectively. If it is not the correct code, the trunk task 104 performs a disconnect procedure, represented by step 214. In step 214, the subscriber may be given another opportunity to enter the correct access code and/or the system may inform the caller that his request to access the system has been denied and disconnect the call.

If no access code is required, or if the correct access code is entered, the system then reviews the trunk pair table 119 to determine if the subscriber's private number is written into the private trunk field 123 for one of the trunk pair records 121 to determine if there is a call waiting, as represented by step 215. If there is no call waiting, the trunk task 104 waits for the subscriber to overdial a set of command signals, as represented by step 216, to indicate why the subscriber called the system. The trunk task 104 then responds to those commands in a step 217.

If the trunk pair table 119 indicates that there is a call waiting, then the trunk task 104 initiates a page-connect connect process with a resource allocation step 218. In the resource allocation step 218, the PCM highway manager 102 (FIG. 6) is employed to establish the individual PCM highways 64a, 64b, 64c, or 64c and the time slots 80 in those highways over which the audio signals between the caller and the called subscriber will be transferred. Four PCM highway/time slot interconnections are needed for each call. A first interconnection is needed to transfer audio signals from the caller's DID card 42 to the switch card 58, and a second interconnection is needed to transfer those signals to the subscriber's DID card. A third interconnection is needed to transfer audio signals originated from the subscriber's DID card 42 to the switch card 58, and a fourth interconnection is needed to transfer those signals to the caller's DID card. These interconnections are established even in the event the caller's call and the subscriber's call are received over the same DID card 42. After these resources are allocated, their identity is stored in the resource allocation field 124 for the trunk pair record 121 for the call.

Simultaneously with the resource allocation step 218 (though depicted as occurring sequentially thereafter), a call announcement step 220 is executed to inform the subscriber of the waiting call because there may be instances when a subscriber calls his private number for reasons unrelated to the outstanding page-connect page and does not know that there is a call waiting. After the announcement step 221, the mink task 104 waits for the subscriber to enter a code indicating that he is not interested in accepting the page-connect call as represented by step 222. If the subscriber is not interested in accepting the page-connect call, the mink task 104 allows the subscriber to use the other system services, as represented., by the alternative-services step 223. The system also stops executing the page-connect task 126 for the calling party. This is performed by an immediate branching to the sign-off sequence starting with the page count-decrement step 202. Also, as part of the alternative services step 223, the caller is informed that the subscriber is unavailable and is then invited to a leave a voice mail message for the subscriber.

If the subscriber elects to proceed with the page-connect call, the trunk task 104 directs the CPT card 47 to generate a short audio signal that is played to the system subscriber as represented by generate connect-tone step 225. Generate connect-tone step 226 is performed so that the telephone call will occur much like a conventional or "plain old telephone service" call, wherein once the caller rings the subscriber, the next thing that happens is that the called party picks up the telephone and is given the opportunity to respond by saying "hello" or other suitable greeting. Simultaneously with, or immediately after execution of generate connect-tone step 225, a PCM highway connect step 226 is performed. In PCM highway connect step 226, a fully duplexed link between the caller and the subscriber is established by the system over the PCM highway 64 using the individual highways and time slots specified in the resource allocation fields 124. At this stage, the parties are able to converse in a normal manner.

As the call progresses, the trunk task 104 monitors the length of the call as represented by call determination step 228. If the call exceeds a predetermined amount of time, the following steps are performed to prevent page-connect calls from taking up so much time that it affects the system's ability to handle other pages. If after a predetermined amount of time the parties have not disconnected, the trunk task 104 will generate a warning tone, as represented by step 230, that will be audible to both the subscriber and caller. The generation of this tone serves as an indication that the parties must terminate their call within a given period of time. If, at the end of this time, the parties have not terminated the call, the trunk task 104 performs autodisconnect step 232. In the autodisconnect step 232, the caller and subscriber are automatically disconnected. Depending on its particular arrangement, the paging system may generate an announcement just prior to the disconnect step indicating that such step is being taken.

Once the caller and the subscriber have disconnected either voluntarily, as represented by step 233, or after the system performs the autodisconnect step 232, the system performs a page-connect page count-decrement step 234, wherein the page-connect page count field is decremented. The system also performs trunk-pair-record erase step 236 wherein the trunk pair record 121 in the trunk pair table 119 for the call is erased.

The telecommunications system of this invention offers a convenient means to provide subscribers an economical interconnect service wherein they can be readily connected to callers who are trying to reach them. This system, since it includes a paging system, can be offered as an add-on service to the population that subscribes to the underlying paging service. There is no requirement that a paging system subscriber elect to use this page-connect service; the subscriber can elect to use the service at his/her option. This allows a paging system subscriber to always have some sort of a basic paging and/or voice-mail service and to take advantage of the page-connect paging service only when he/she has a particular need for the service.

The prioritization subtask 132 of this paging system serves to place paging requests for the page-connect pages at the head of the paging request list 129. This ensures that these pages are generated and broadcast first. This serves to minimize the amount of time that callers to page-connect subscribers have to wait for the subscribers to receive the page and establish connection with the paging terminal 28 so that the call can be connected. This reduces the likelihood that a caller will become impatient and hang up. Moreover, by reducing the time that a caller for a page-connect page subscriber is parked, the overall amount of time that is spent servicing page-connect calls, at the expense of other system services, is similarly reduced.

Still another feature of this invention is that the execution of the page-connect pages maximum-number-reached determination step 164 and of the page-connect call maximum-time-reached determination step 228 serves to minimize the extent to which page-connect pages monopolize the trunks 66 connected to the paging terminal 28. This serves to minimize the extent to which page-connect pages may prevent other pages from being processed by the terminal 28 and broadcast over the paging system.

The system subscribers of the telecommunications system of this invention who are also CT-2 system subscribers are provided with a convenient means of using their CT-2 telephones to establish a communications link whereby they not only can call other parties, but can also be called themselves. Calls to system subscribers are simply broadcast over the paging system. This eliminates the need to provide expensive tracking circuitry with the CT-2 system so that the calls can be routed to the subscribers over nearby base stations 36. Moreover, in the event that the CT-2 subscriber is out of range of the base stations 36, the system still offers subscribers significant utility. The subscriber will, over the pager 27, still be able to receive a page-connect page. Then, if the subscriber has ready access to some other telephone, he can complete the call though access to the PSTN 32 even though the call cannot be completed through his handset 26.

Figure 11:
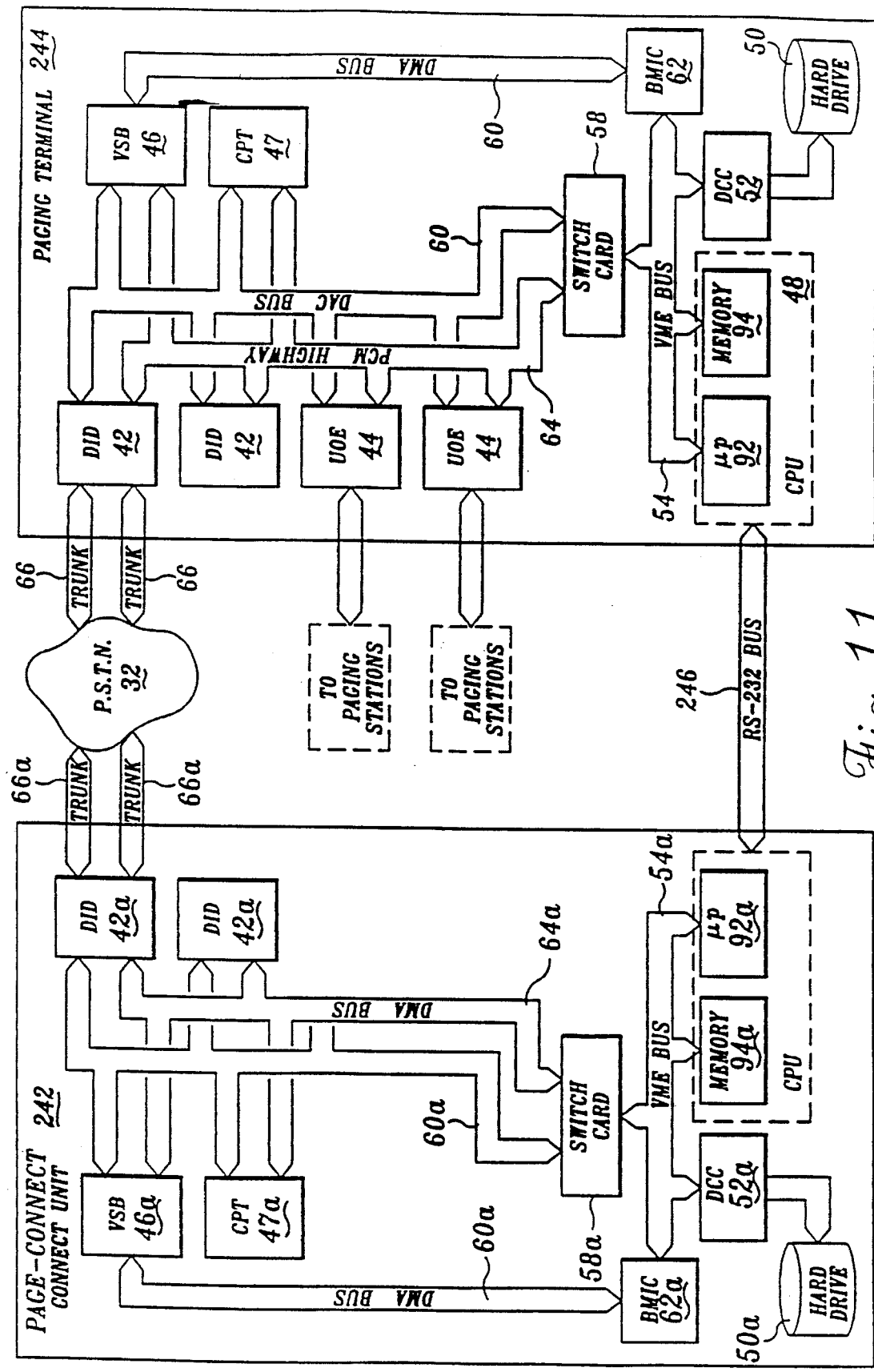
FIG. 11 illustrates in block diagram an alternative paging system terminal of this invention.

FIG. 11 illustrates an alternative embodiment of a telecommunications system 240 of this invention. In this embodiment of the invention, there are two separate physical units, a page-connect connect unit 242 and a paging terminal 244. The paging terminal 244 has the base structure similar to that of the paging terminal 28 described with respect to the first embodiment of the invention. The page-connect connect unit 242 includes one or more DID cards 42a, a VSB 46a, a CPT card 47a, a switch card 58a, a DCC 52a, a BMIC 62a, a DMA bus 60a, and a hard drive 50a that are similar to the previously described paging terminal subunits. Digitized voice information is exchanged between the DID cards 42a, the VSB 46a, and the CPT card 47 over a PCM highway 64a. A switch card 58a controls the exchange of information over the PCM highway 65. A CPU 48a in the page-connect connect unit 242 regulates the response of the unit to incoming calls. Data, control, and audio signals between the page-connect page connect unit CPU 48a and the complementary CPU in the paging terminal 244 are exchanged over a RS-232 serial data bus 246. The system of this embodiment of the invention may further include complementary communications processes in the CPUs 48 and 48a to facilitate the exchange of signals over bus 246.

In this embodiment of the invention, the lines connected to the paging terminal 244 are public and private lines for subscribers who do not subscribe to the page-connect paging service. The public and private lines for the subscribers who take advantage of the page-connect paging service are all connected to the DID cards 42a in the page-connect connect unit 242. When a call for a page-connect subscriber is received over one of the DID cards 42a in the page-connect connect unit 242, the CPU 48a processes the call in a similar manner to that described with respect to the first described embodiment of the invention. Once the CPU 48a generates a page request, the request is then forwarded over the RS-232 bus 246 to the CPU 48 in the paging terminal 244. Upon receipt of the paging request by the paging terminal CPU 48, the paging terminal 244 then forms a page in the described manner and transmits it to the paging stations 30 for subsequent broadcast. A subscriber's response to the page-connect page is received over one of the page-connect connect unit DID cards 42a. When the response is received, the page-connect connect unit CPU 48a then directs the switch card 58a to establish an appropriate connection between the DID cards 42a over the PCM highway 64a so the connection between the caller and subscriber can be established. If the caller cannot be connected to the subscriber or if the call is from a subscriber for purposes other than establishing a page-connect call, the connect unit 242 serves as a voice mailbox in which the caller can leave a message that the subscriber can retrieve at his convenience.

Figure 12:
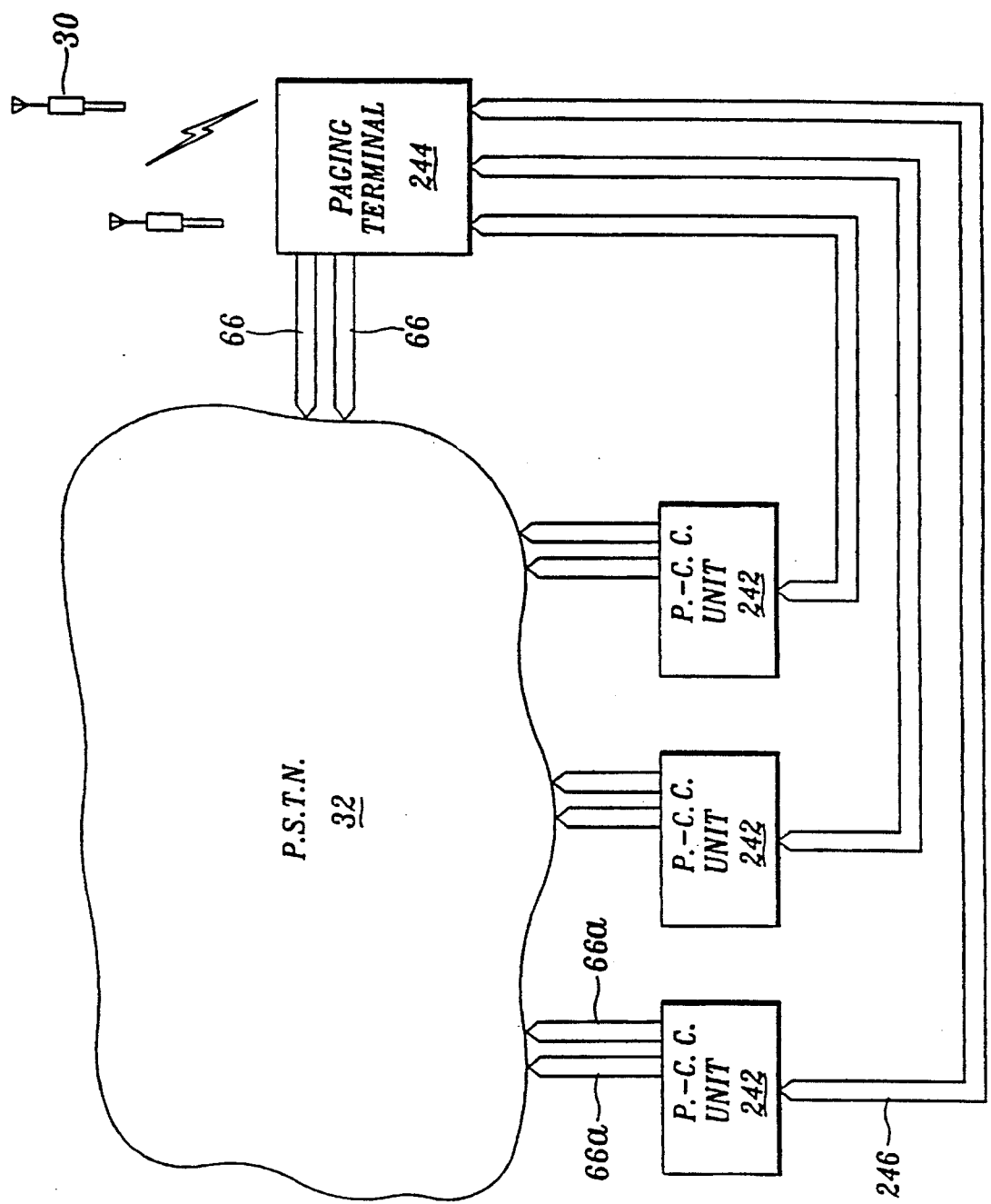
FIG. 12 illustrates in block diagram how the paging system of FIG. 11 can be configured.

As depicted by FIG. 12, this version of the invention can be configured so that multiple page-connect connect units 242 can be connected to a single paging terminal 244. Each page-connect connect unit 242 creates page requests in response to incoming calls for subscribers assigned to the particular unit. The page requests are forwarded from the page-connect connect units 242 to the paging terminal 244 over a set of communication buses 246. The paging terminal 244, in response to receiving a page request from one of the page-connect connect units 242, generates a page and forwards it to the paging stations 30 over the associated bus 246 for broadcast. The subscriber can then establish an interconnection with the caller by accessing the page-connect connect unit 242 that was accessed by the caller. In these versions of the invention, the page-connect connect units 242 may be located in close proximity with the paging terminal, i.e., the same room. When the system is so constructed, communication bus 246 may take the form of an RS-232 bus. Alternatively, one or more of the page-connect connect traits 242 may be located several kilometer or more from the paging terminal. In this situation, communication bus 246 may take the form of a dedicated fiber-optic link or a common carrier circuit. It may also be desirable to connect the page-connect connect units 242 to multiple paging terminals 244. In the event one paging terminal 244 fails, the other terminal would still be able to generate pages for forwarding to the subscribers.

An advantage of this embodiment of the invention is that it provides a means for system operators to first provide a paging service and then at a later time provide a page-connect paging service. Moreover, this embodiment of the invention allows the system operators to configure their systems so that the page-connect subscribers' calls are all processed by one or more page-correct connect units 242 and the calls for the other subscribers are processed by the regular paging terminal 244. The PCM highway 64 (FIG. 11) in the paging terminal 244 forms the communication link over which voice messages are transferred to and from non-page-connect system subscribers. A second set of PCM highways, the PCM highways 64a (FIG. 11) in the page-connect connect traits 242 function as the fully duplexed communications links used by page-connect system subscribers. This arrangement maximizes the number of page-connect subscribers the system can handle. Also, as the demand for page-connect paging grows, the system can be reconfigured to accommodate the additional subscribers through the installation of additional page-connect connect units 242. Still another advantage of this arrangement is that a first set of P.S.T.N. trunk lines, trunk lines 66, can be dedicated to system subscribers that only want to use the basic paging service while a second set of trunk lines, trunk lines 66a, can be dedicated to the customers that want the page-connect paging service.

Furthermore, this embodiment of the invention allows an organization, such as a business or a hospital, to operate its own page-connect paging system in conjunction with the paging network run by a larger organization, such as a public utility. The organization that wants to provide its members with page-connect paging would operate the page-connect connect unit 242. The paging terminal 244 would be part of a paging system operated by the public utility. The page requests generated in response to incoming calls by the page-connect connect unit 242 would be transmitted over any communication bus 246 to the paging terminal 244. This arrangement offers a means for an organization to offer its members a page-connect paging service without having to go to the expense of operating its own paging stations 30 and support equipment.

Figure 13:
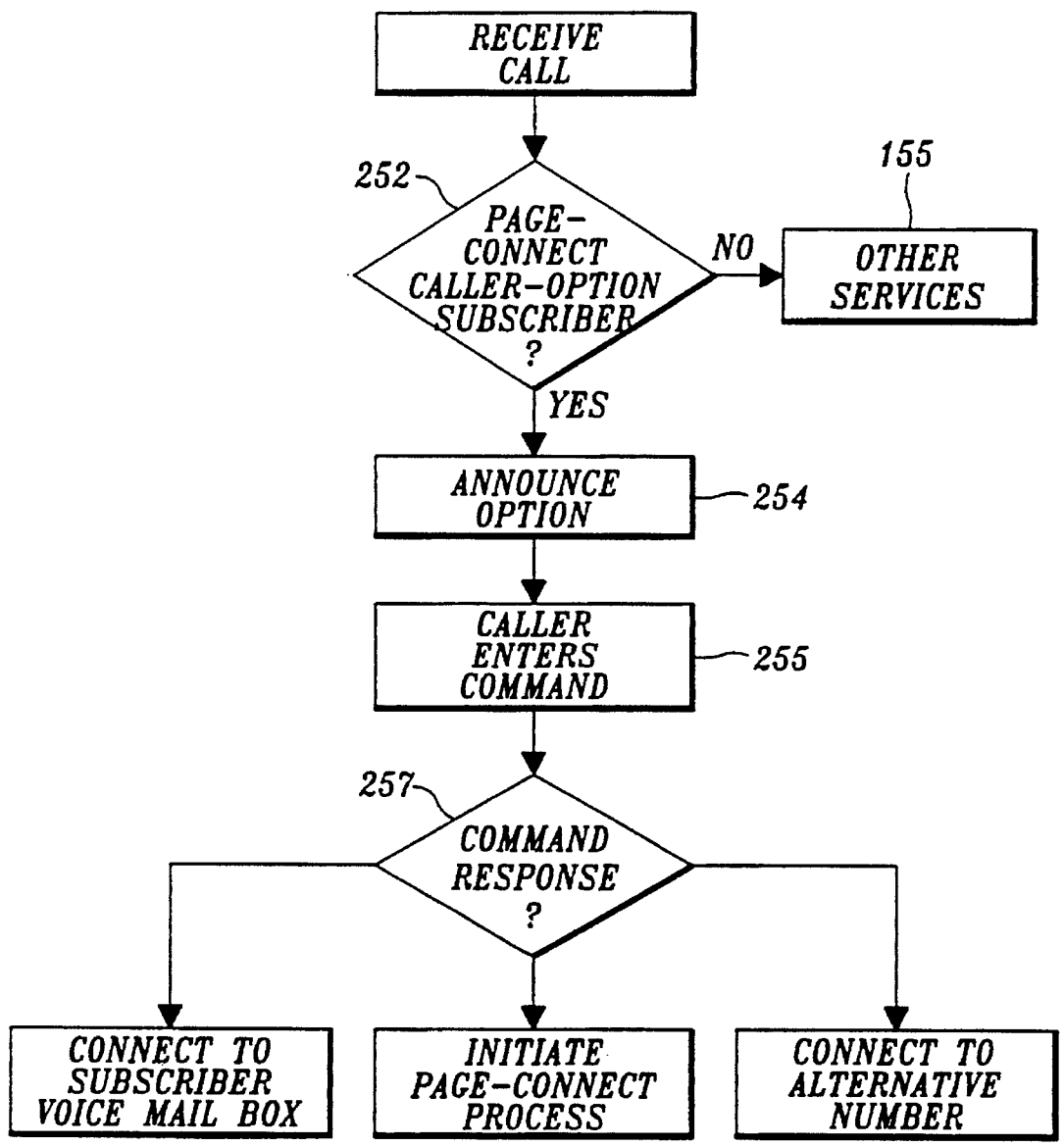
FIG. 13 represents a flow chart of the steps performed by the paging system of this invention when the caller option task is executed.

Moreover, still other versions of the invention may include the caller option task 125, the call notifier task 139, or the subscriber option task 133 (FIG. 6). The caller option task 125 allows a person calling a subscriber to elect to have a page-connect page sent in order to try to be connected to the subscriber or to have the call sent to an alternative destination. As depicted by FIG. 13, if the system includes this feature, once an incoming call is recognized as being directed to a particular subscriber, the trunk task 104 first determines if the subscriber is a page-connect subscriber who also subscribes to the caller option package, as represented by step 252. If the subscriber does not employ these services, the trunk task proceeds to the other services step 155. In this version of the invention, the other services may include the generation of a page-connect page according to the previously described process. If the subscriber employs the caller option task 125, the task 125 is executed. The caller option task 125 initially performs an announce options step 254. In step 254, the system invites the caller to wait to be connected to the subscriber, leave a message in the subscriber's voice mailbox, or be connected to someone else, for example, the subscriber's secretary. This message is in the form of a standard message that is the same regardless of the subscriber to whom the incoming call is directed or it may be a customized message that was prerecorded by the system subscriber. The caller then overdials a command to the system to indicate the selected option as represented by step 255. Based on that command entered by the caller, the system takes appropriate action as represented by step 257. These actions include executing the page-connect task 126, connecting to the subscriber's voice mailbox, or forwarding the call to the designated telephone.

Figure 15:
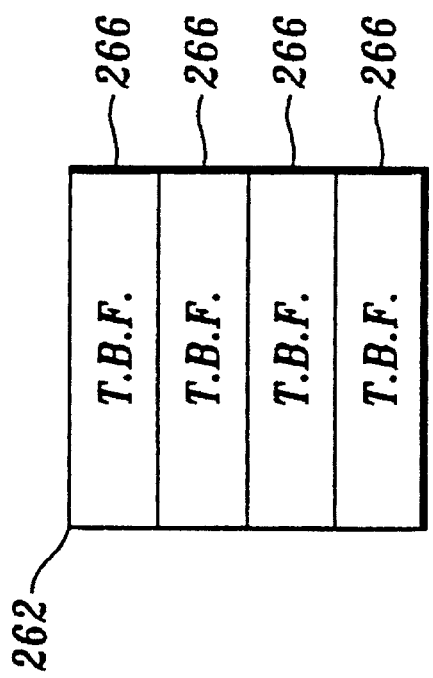
FIG. 15 represents the structure of the time table that is referenced by the call notifier task of this invention.
Figure 14:
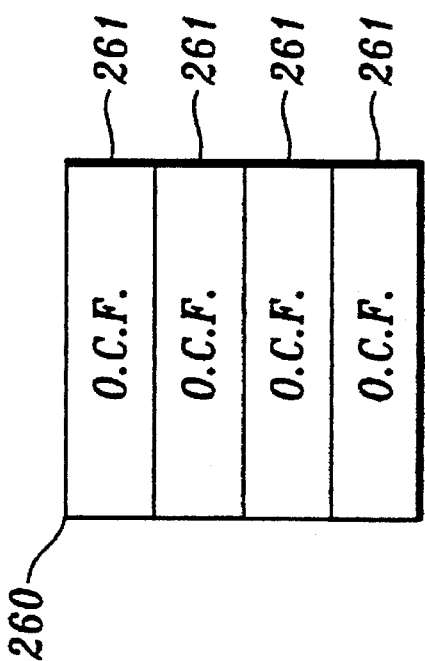
FIG. 14 represents the structure of the outcall code table that is referenced by the call notifier task of this invention.

The call notifier task 139 (FIG. 6) is used by a subscriber who may want to have a page forwarded to a specific telephone number based on the time of day the call is received. For example, an individual may want a page sent to a private business phone during the business day, a car phone or a pager during evening commuting hours, a home phone in the evening, and a voice mailbox on the weekends. The call notifier task 139 maintains an outcall code table 260, depicted by FIG. 14, and a time table 262, depicted by FIG. 15 for each subscriber who uses the task. The outcall code table contains a set of subscriber-generated outcall code fields (OCFs) 261 that designate the numbers to which the subscriber wants the page forwarded. Each outcall code field 261 comprises either a telephone number where the subscriber wants the call forwarded or the cap code of a pager to which the call should be forwarded. In versions of the invention that have this feature, the cap code field 116 in the record 108 (FIG. 7) of a subscriber who employs this feature will actually contain an address that points to the time table 262 for the subscriber. The time table 262 contains a set of user-generated time block fields (TBFs) 266. Each time block field 266 contains a pointer to the outcall code field 261 that contains the indication of which number a page should be forwarded based on the day-of-week and time-of-day it is received.

Whenever a page, such as page-connect page, is generated, based on the material contained in the cap code field 116 for the subscriber, the queuing and coding task 128 will either generate a page for broadcast to the single pager assigned to the subscriber or execute the call notifier task 139 (FIG. 6). The call notifier task 139, based on the current day-of-week and time-of-day and the data in the time table 262 for the subscriber, determines which outcall code field 261 (FIG. 14) contains an indication of the telephone number or pager to which the page should be forwarded. If the designated outcall code field 261 contains a cap code indicating the page should be forwarded to a pager, the queuing and coding task 128 generates the page in the normal manner and the page is forwarded to the paging stations 30 (FIG. 1) through a UOE card 44 (FIG. 2). If the designated outcall code field 261 contains an indication that the page is to be forwarded to a conventional telephone, the queuing and coding task 128 forwards the page to a DID card 42 (FIG. 2). Based on coding signals placed in the page by the queuing and coding task 128, the signal generator on the DID card 42 places a call to the designated telephone over a free trunk line. The call contains a message generated by the queuing and coding task that informs the subscriber of the page.

Figure 16:
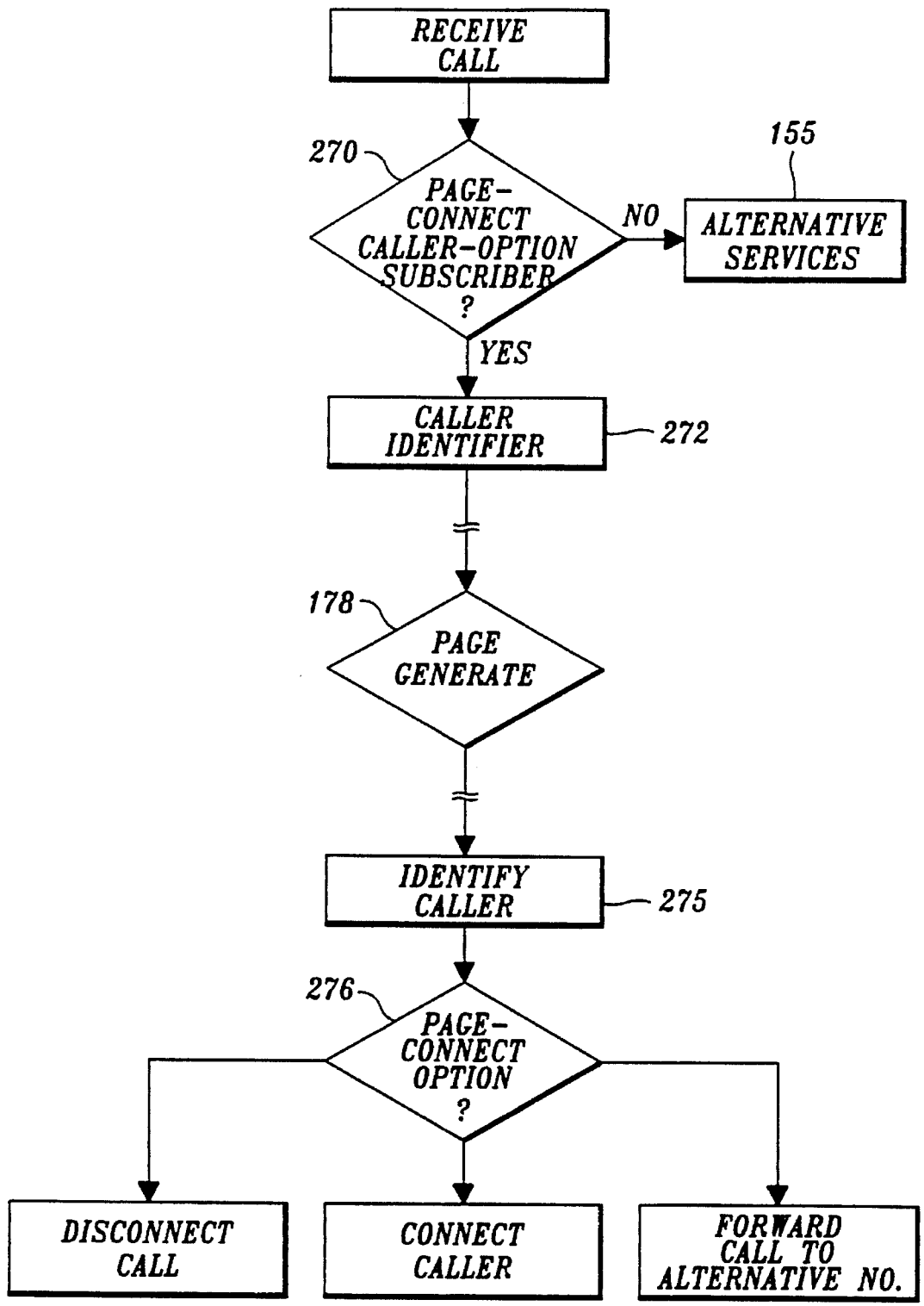
FIG. 16 represents a flow chart of the steps performed by the paging system of this invention when the subscriber option task is executed.

The subscriber option task 133 (FIG. 6) gives the subscriber a number of options on how to respond to a page-connect page. In versions of the invention in which this task 133 is installed, the trunk task 104 first determines if the subscriber employs this feature as represented by step 270 in FIG. 16. If the subscriber does not employ this feature, the system proceeds to the alternative services step 155. Step 155 may, in some versions of the invention, include the initiation of the previously described page-connect process. If the subscriber employs this feature, the system invites the caller to identify himself as depicted by caller identification step 272. In caller identification step 272, the caller speaks his name in response to a voice prompt from the system or may overdial a set of digits to provide an alternative form of identification. When the invention is installed into a PSTN 32 that offers automatic number identification, the PSTN will automatically provide an indication of the telephone number from which the call was made. In these versions of the invention, it may be possible to eliminate the caller identification step 272.

The processing of the page-connect call then proceeds in the normal manner. As part of the generate page-connect step 178, an indication of the calling part 3, is embedded in the page. If the subscriber has a voice pager 29 or the call notifier is employed to forward the page to a telephone, the caller's spoken identification will be forwarded to the subscriber as represented by step 275. If a series of digits were entered to identify the caller, the digits may be presented on a display integral with the pager or spoken to the subscriber after being generated by a speech synthesis module. If the page was simply being sent to a subscriber with a tone-only pager, the system informs the subscriber of the identity of the caller when the subscriber calls the system.

Once the subscriber is informed of the identity of the caller, the subscriber performs a page-connect option step 276. In this step, the subscriber enters an overdial command that indicates his willingness to proceed with the page-connect call and speak with the caller, forward the call to an alternative destination or to have the call disconnected. Depending on how the system is configured, the subscriber can forward the call to a specific telephone number, for example, a secretarial station, or to the subscriber's voice mailbox so the caller can leave a message.

The caller option task 125 provides the caller with the option of either having the page-connect task 126 executed, so that the caller can try to be connected to the subscriber, or to simply leave a message in the subscriber's voice-mailbox. Thus, in the event the caller does not need to speak with the subscriber, the caller can simply leave a message and is free from having to wait for the system to execute the whole page-connect process. The call notifier task 139 forwards pages, including page-connect pages, to the pager or the terminal device closest to the subscriber depending on the day-of-week and the time-of-day. This maximizes the possibility that the page will be forwarded to a terminal near the subscriber so that the subscriber will respond to the call. The subscriber option task 133 allows the subscriber to determine who is calling and whether or not the page-connect call should be completed or routed to an alternative destination.

The foregoing description has been limited to specific embodiments of the invention. It will be apparent, however, that variations and modifications may be made to the invention with the attainment of some or all of the advantages of the invention. For example, the described hardware components of this invention are illustrative and are not to be construed as limiting. For instance, the DID cards 42 described as performing the interface functions can be readily replaced by other interface boards, such as end-to-end cards. Incorporation of these cards would require a caller to overdial a set of digits into the system to provide a header message for the CPU 48 to indicate whether the caller was a subscriber, or merely a person trying to reach the subscriber, and the particular identity of the relevant subscriber. Other versions of the invention may employ digital trunk cards (DSIs) as the interface boards. Also, in some versions of the invention there may be more than one hard drive 50. In these versions of the invention, multiple hard drives may be connected to a single DCC 52 through a common bus. It should further be understood that in these versions, while each hard drive 50 is a separate physical unit, collectively they function together as a single, common, memory for storing voice messages and pages that are received over any of the DID cards 42. In a similar vein, it should be understood that there may be more than one microprocessor 92 in the central processing unit 48. In these versions of the invention, one microprocessor may, for example, handle the mink tasks 104 while the other microprocessor may execute the Q & C tasks 128, the UOE task 134, and the voice storage task 136. Furthermore, it should be clear that in some versions of the invention the UOE cards 44 may actually form the page batches 68 and send them prior to their transmission to the paging transmitters, as opposed to having the batches formed by a task running on the CPU 48. It should similarly be understood that this system need not employ the CT-2 equipment described in this application. The telecommunications system of this invention may employ any telephone equipment that allows a subscriber to make a call through the PSTN. The advantage of this 'system is that it eliminates the need to provide tracking equipment that is otherwise needed to inform a subscriber that he/she has an incoming call. The features or options the system of this invention offers a subscriber may also vary with the services offered by the utility that operates the publicly switched telephone network 32 to which the system is connected.

It should also be recognized that in some versions of the invention it may be possible to eliminate the switch card 58 and/or the call progress tone card 47. The switch card 58 could be eliminated by providing a signal bus that does not have dedicated transmit and receive highways and by giving the central processing unit that controls overall operation of the paging terminal 28 the ability to establish inter-card signal transfer over the bus. The call progress tone card 47 can be eliminated by providing the terminal with one or more digital signal processors that are capable of generating the digital-signal versions of the various tones callers to the system should hear. The digital signal processors can also be used to generate the DTMF switch code tones that are produced when the system makes an outcall during the execution of the call notifier task 139. Furthermore, in some systems it should be recognized that the digitized signal transfer of voice signals between the cards may not be in PCM format but in other digital signal formats, for example, adaptive differential pulse code modulation, ADPCM format.

It should similarly be understood that there is no requirement that each page-connect subscriber be provided with both a public telephone number and a private telephone number. In some versions of the invention the subscriber may have just a single telephone number that he/she can distribute. When a person accessing the subscriber uses the number, the call will be processed in a manner similar to that described above. When the subscriber accesses the system, he/she will use the same number and overdial an identification code into the system to serve as a message that the call is from the subscriber. The call will then be processed like a call over the subscriber's private number. In these embodiments of the invention, the trunk pair table 119 for each page-connect each contains a single subscriber number field to indicate that it is processing a call for that subscriber, a first mink identification field to identify the location of the caller's call on a DID card, and a second mink identification field to identify the subscriber's call.

Moreover, it is clear that there are numerous variations in how the system may operate. For example, some particular subscribers may elect to be page-connect page subscribers but not voice-mail subscribers. Callers who are not connected to the called subscribers would not be invited to leave messages for later retrieval. Some versions of the invention may alternatively be arranged so that the subscriber must first enter an accept code to indicate he wants to accept a page-connect call as opposed to entering a code only when he is not willing to accept a page-connect call. It should further be understood that, in some enhanced versions of the system, it may be desirable to provide operator assistance in the event the caller needs help using the system or a subscriber needs the same type of assistance. It should further be understood that the described software tasks and steps performed thereby are similarly meant to be exemplary. For example, in some versions of the invention the queuing and coding tasks and the UOE tasks may be performed by a single monolithic software module. Also the page-connect task 126 may not be a distinct subtask of the trunk task 104. Instead, the page-connect task 126 may be a collection of smaller tasks that are contained within the trunk task 104 and arranged to cooperate so that the pager-connect call connections are established. In a similar vein, it should be understood that the page connect task 126, the caller option task 125, and the call notifier task 139 may not be distinct tasks but maybe integrated into other software processes.

Furthermore, the steps performed may vary either in the order in which they are performed or in their nature. For instance, in some versions of the system, it may not be necessary to perform the page-connect page maximum-number-determination step 164 or the page-connect call-time-limiting step 222 to limit the number of page-connect calls. Furthermore, some subscribers may be provided with a page-until-pickup feature. In this feature, the subscriber is repetitively paged until he calls the paging terminal 28 or the caller hangs up. While not a recommended feature to be employed with the page-connect system of this invention, it is one that could be employed if it was necessary for particular subscribers. Thus, it is the object of the appended claims to cover all such variations and modifications as come within the true spirit and scope of this invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A telecommunications system capable of receiving telephone calls for meet-me page subscribers and telephone calls for non-meet-me page subscribers from a publicly switched telephone network, wherein the subscribers are provided with portable page receivers, comprising:

a paging system including a first processing circuit connected to the publicly switched telephone network for receiving telephone calls to the non-meet-me page subscribers, which, in response to the telephone calls, generates page requests; a second processing circuit connected to said first processing circuit for receiving said page requests, which, in response to said page requests, forms one of pages or page messages according to a time of the day at which the page requests are received and selectively forwards said one of pages or page messages to one of a plurality of terminal devices;

a meet-me unit connected to the publicly switched telephone network for receiving telephone calls to the meet-me page subscribers and for receiving telephone calls from the meet me page subscribers, wherein said meet-me unit is capable of distinguishing between calls to the meet-me page subscribers and calls from the meet-me page subscribers and in response to an incoming call for a specific meet-me page subscriber, generates a meet-me page request and parks the incoming call, said meet-me unit including means for generating a ring signal to a caller for a predefined time interval while said incoming call is parked, so that a caller is at least initially unaware that a meet-me page request has been generated and wherein said meet-me unit is further connected to said paging systems second processing circuit for forwarding said meet-me page request thereto; and call connection circuitry integral with said meet-me unit for determining from which meet-me page subscriber that said meet-me page subscriber call has been received, determining if said parked call is for the calling meet-me page subscriber; and, if said parked call is for the calling meet-me page subscriber, establishing a single link between said parked call and the call from the meet-me page subscriber, said caller being connected in communication with the calling meet-me page subscriber without being informed that the calling meet-me page subscriber has been paged if the signal link is established within said predefined time interval.

2. The telecommunications system of claim 1, wherein a terminal device is a paging station connected to said second processing circuit for receiving said pages and broadcasting said pages to the paging receivers.

3. The paging terminal of claim 1, wherein:

said first processing circuit is further configured to obtain a caller identification if the call is to a meet-me system subscriber and forward the caller identification to said second processing circuit; said second processing circuit generates said pages so that said page forwarded to the meet-me system subscriber includes the caller identification; and said first processing circuit is further configured to receive a command entered by the meet-me page system subscriber and selectively connects the caller to the meet-me page system subscriber based on the command entered by the meet-me page system subscriber.

4. The paging terminal of claim 1 or 3, wherein said first processing circuit is configured to receive a command from the caller to the meet-me page system subscriber and, based on the received command, generates said page request to said second processing circuit or connects the caller to an alternative service.

5. The paging terminal of claim 4, wherein said second processing circuit selectively forwards said page to a page receiver or to a terminal device accessed through the publicly switched telephone network based on when the call to the page-connect page system subscriber is received.

6. The paging terminal of claim 4, wherein said plurality of terminal devices are accessed through the publicly switched telephone network.

7. A meet-me unit connected to a publicly switched telephone network for receiving telephone calls to meet-me page subscribers and for receiving telephone calls from the meet-me page subscribers, and further connected to a paging terminal, said unit comprising:

a first processing unit capable of distinguishing between calls to the meet-me page subscribers and calls from the meet-me page subscribers and in response to an incoming call for a specific meet-me page subscriber, generating a meet-me page request, selectively forwarding said page request to one of a plurality of terminal devices based on a time of day at which the call to the system subscriber is received, and parking the incoming call; and a second processing unit connected to said first processing unit for determining from which a meet-me page subscriber a call is received, determining if said parked call is for the meet-me page subscriber unless a predefined number of incoming lines are busy, where said predefined number is substantially less than a maximum available of the number of incoming lines; and if said parked call is for the meet-me page subscriber who is calling, establishing a single link between said parked call and the call from the meet-me page system subscriber who is calling.

8. The meet-me unit of claim 7 wherein one of a plurality of terminal devices is the paging terminal.

* * * * *